(12) United States Patent
Napier et al.

(10) Patent No.: US 7,406,440 B2
(45) Date of Patent: Jul. 29, 2008

(54) SYSTEMS AND METHODS TO SUPPORT APPROVAL TO SETTLE AN INTERNATIONAL TRADE FROM A CREDIT FACILITY, SUCH AS A LINE OF CREDIT OR A DEMAND DEPOSIT ACCOUNT

(75) Inventors: Graham R.F. Napier, Burlingame, CA (US); Steve M. Viarengo, Danville, CA (US); Manoj Narayan, Foster City, CA (US); Allen R. Bornscheuer, Tampa, FL (US)

(73) Assignee: Tradebeam, Inc., San Mateo, CA (US)

( * ) Notice: Subject to any disclaimer, the term of this patent is extended or adjusted under 35 U.S.C. 154(b) by 427 days.

(21) Appl. No.: 10/776,587

(22) Filed: Feb. 11, 2004

(65) Prior Publication Data

US 2005/0177447 A1    Aug. 11, 2005

(51) Int. Cl.
*G06Q 30/00* (2006.01)
(52) U.S. Cl. .................. 705/26; 705/1; 705/7; 705/24; 705/27; 705/28; 705/37
(58) Field of Classification Search ............ 705/26, 705/27, 37, 7, 19, 1, 24, 28
See application file for complete search history.

(56) References Cited

U.S. PATENT DOCUMENTS 6,915,268 B2 * 7/2005 Riggs et al. .................. 705/7
7,155,409 B1 * 12/2006 Stroh ........................ 705/37
7,249,069 B2 * 7/2007 Alie et al. .................. 705/28
2002/0091574 A1 * 7/2002 Lefebvre et al. ............ 705/19
2003/0040947 A1 * 2/2003 Alie et al. ................... 705/7
2003/0069831 A1 * 4/2003 Le et al. ..................... 705/37
2006/0173693 A1 * 8/2006 Arazi et al. ................. 705/1

OTHER PUBLICATIONS

Page 133 of the book, "Banking & Finance Technology"; Fourth edition; American Bankers Association; Washington DC 20036, 1999.*
International Search Report and Written Opinion of the International Search Authority for Intl. Appl. No. PCT/US05/040 mailed Oct. 5, 2006.
Tradecard, Inc. v. S1 Corp., 509 F. Supp. 2d 304 (S.D.N.Y. 2007).

* cited by examiner

*Primary Examiner*—Yogesh C Garg
(74) *Attorney, Agent, or Firm*—Haynes, Beffel & Wolfeld LLP

(57) ABSTRACT

The present invention relates to systems and methods to support import-export transactions. More particularly, it includes methods and systems for negotiating terms for settlement of an international shipment, for advising an agreed bank that the terms have been met and for remittance from a line of credit or similar credit facility or a demand deposit account.

25 Claims, 20 Drawing Sheets

| Dashboard | Ref. No. | Port of Loading | Port of Discharge | ETA | ETD | Seller |

PO 65473678 — 232

SETUP
SUMMARY — 410    PAYMENT ADVICE    428 — Preview Doc   Send Doc   List Log — 224

ORDER
☑ Purchase Order    [Submit] [Cancel] — 221    Add Notes to Page Log    Assign Action    Approval Status [In Progress ▼]

SHIPMENT
☑ Bill of Lading
☑ Manage Docs    222    Current Owner — 223    Current Status: New — 225

SETTLEMENT
☑ Authority To Pay
☐ Invoice
☐ Reconciliation
☐ Remittance Advice

| Summary | Details | Parties | Page Log |

1027

1031 → Payment Advice Type [Bank ▼]
1032 → Payment Advice Purpose
1033 → Payment Settlement Date [Month ▼] [Day ▼] [Year ▼]    1042 → Payment Advice No
1034 → Total Amount Due  250,157.23    1043 → Bank Approval Date [Month ▼] [Day ▼] [Year ▼]
1035 → Total Amount Paid  0.00    1044 → Bank Charges  0.00
1036 → Currency [US Dollar ▼]    1045 → Other Charges  0.00
1037 → Payment Method    1046 → Remarks
1038 → Payment System    1047 → Bank Reference No. <21>  PO_065473678
1039 → Payment Terms  Payment Terms    1048 → Invoice Reference  1234567
1041 → Payment Reason Code    1049 → ATP Number  1234567
       1051 → Other Reference No

| Seq No. | Order/Line Item No. | Amount Due | Amount Paid | Difference | Reason for Difference |
|---|---|---|---|---|---|
| 1 | 1/ | 243,600.00 | 0.00 | 0.00 | ☐ |
| 2 | 2/ | 1,870.00 | 0.00 | 0.00 | ☐ |
| 3 | 3/ | 4,687.23 | 0.00 | 0.00 | ☐ |

[Add Rows]      Checked Items [Delete Selected]

| Reliance Nagoya To Charleston ▼ | - Apply Template | | ☐ Save as Template | ☑ Save To Trade |
|---|---|---|---|---|
| 1201 | | | | |

Participants — 1231

| Name | Title | Role | Company | Trade Admin |
|---|---|---|---|---|
| David Half | Manager, Imports | Customs Banker | Brown & Sons Cleaning | |
| J Misushima | Director, U.S. Sales | Exporter | Reliance Industries | Y |
| Hank McArthur | Manager, Global Sourcing | Importer, Customer | ACME | Y |
| Junko Takemoto | Manager, Exports | Export Forwarder | Yamamoto Forwarding Co. | Y |
| John Matheson | Account Manager | Banker | ABC Bank, Inc. | |

ORDER (Edit) — 1240

| Application | Participants |
|---|---|
| Manage Docs | Hank McArthur-RM, J Mizushima-A |
| EDI Sales Order | Hank McArthur-R, J Mizushima-RMA |
| Compliance Check | Hank McArthur-RA, Junko Takemoto-RM, J Mizushima-RMA |
| Insurance Certificate | Hank McArthur-R, J Mizushima-RMA |

1202

SHIPMENT (Edit) — 1250

| Application | Participants |
|---|---|
| Booking Info | J Mizushima-RMA, Hank McArthur-R, John Matheson-R, Junko Takemoto-RM |
| Export Shipping Instructions | J Mizushima-RMA, Hank McArthur-R, Junko Takemoto-RM |
| Packing List | Junko Takemoto-RM, J Mizushima-RMA |
| Export Customs | Junko Takemoto-RMA |
| Bill of Lading | Junko Takemoto-RM, J Mizushima-RMA |
| Manage Docs | Hank McArthur-RMA, J Mizushima-RM |
| Import Shipping Instructions | John Matheson-RMA, J Mizushima-R |
| Import Customs | David Half-RMA, Hank McArthur-RM, J Mizushima-R |
| Proof of Delivery | John Matheson-RM, Hank McArthur-RMA, J Mizushima-R |

SETTLEMENT (Edit) — 1260

| Application | Participants |
|---|---|
| Approval to Pay | Hank McArthur-RM, J Mizushima-A, J Matheson-R |
| Invoice | Hank McArthur-R, J Mizushima-RMA |
| Manage Docs | Hank McArthur-RMA, J Mizushima-R |
| Reconciliation | Hank McArthur-RMA, J Mizushima-RMA |
| Insurance Claim | Hank McArthur-R, J Mizushima-R, J Matheson-R |
| Payment Advice | Hank McArthur-R, J Mizushima-R, J Matheson-RMA |

1203

(Edit) — 1270

© 2001-2003 TradeBeam Inc.

INSURANCE CERTIFICATE — 1410

[Submit] [Cancel] — 221   428 — Preview Doc | Send Doc   224

Add Notes to Page Log    Assign Action    Approval Status
                         J Mizushima ▶   In Progress ▶
    222                  Current Action:  Current Status:
                         J Mizushima     In Progress — 225

Tabs: Summary | Details | Parties | Tracking | Page Log — 1427

SETUP SUMMARY
ORDER
☑ EDI Sales Order
☑ Compliance Check
⊞ Insurance Certificate

SHIPMENT
☐ Booking Info
☐ Export Shipping Instructions
☐ Packing List
☐ Export Customs
☐ Bill of Lading
☐ Manage Docs
☐ Import Shipping Instructions
☐ Import Customs
☐ Proof of Delivery

SETTLEMENT
☑ Letter of Credit
☐ Invoice
☐ Manage Docs
☐ Reconciliation
☐ Insurance Claim
☐ Remittance Advice Policy Type    OpenPolicy — 1431
Policy No    ICP-000001 — 1432
Policy Effective Date    Jan 01 2002 — 1433
Certificate Reference No    ICRF-55090 — 1434
Insurance Certificate No.    IC1000789 — 1435
Insurance Certificate Date    Nov 01 2002 — 1436
Insurance Certificate Place    Nagoya, Japan — 1437
War SRC Risk    Yes — 1438
Insured Amount    87680.00 — 1439
Currency    USD — 1441
Amount In Words    Eighty Seven Thousand Six Hundred Ninety and 00/100 U.S. Dollars — 1442
Additional Covered Risks    All risks, war risks, strikes, riots and civil commotions, theft, pilferage and non- — 1443
                             delivery.

Shipper — 1460
    Name    Reliance Industries
    Address1    2-3 Marunouchi
    Address2    3-chome
    City    Chiyoda-ku
    State/Province    Tokyo
    Postal Code
    Country    Japan
    Note Transit Mode    Ocean — 1444
Place Of Loading    Nagoya, Japan — 1445
Tranship To — 1446
B.O.L. No.    AVXI735658396 — 1447
B.O.L. Date    Feb 06 2002 — 1448
A.W.B. No. — 1451
B.O.L. Date    Feb 06 2002 — 1452
Departure Date    Nov 01 2002 — 1453
Commodity    Plastic Resin — 1454
Cargo Description    5 x 40ft Dry FCL containers — 1455

Country Of Origin    Japan — 1461
Place Of Receipt    Charleston, NC — 1462
Final Destination    Monroe, NC — 1463
Carrier Name    Meridian Lines — 1464
Vessel Name    Victoria Bridge — 1465
Voyage No    VN 21E — 1466
Airline Name — 1467
Flight No — 1468

Commodity Plastic Resin
Cargo Description  5 x 40ft Dry FCL containers
                   4 x 20ft Dry FCL containers ——— 1455
Loss Payable To    The order of ABC International Bank ——— 1471
Claim Settling Agent  ABC International Bank Settling Agent ——— 1472
                   Tokyo, Japan

| Seq. No. | Description | Marks and Nos. | Quantity | UoM | Package | UoM | Gross Weight | UoM |—1473

Consignee ——1474
    Name  Monroe Imports
    Address1  648 Elm St
    Address2
    City  Monroe
    State/Province  NC
    Postal Code  27851
    Country  United States
    Note Notify Party ——1475
    Name  Reliance Industries
    Address1  2-3 Marunouchi
    Address2  3-chome
    City  Chiyoda-ku
    State/Province  Tokyo
    Postal Code  100
    Country  Japan
    Note Insurance Conditions  No suit or action against the Company shall be sustainable in any Court of Law or ——1476
                      Equity, unless commenced within twelve (12) months.

Special Conditions   On Deck: Merchandise shipped on deck subject to an on deck bill of lading which ——1477
                     must be so specified in this policy.

Forwarding Agent References  FAR12212849 ——— 1481          Export References  ER55090 ——— 1491
Export Instructions  all cargo must be strapped ——1482    Onward Inland Routing  truck to Monroe ——1492
                     and corner loaded ——1483
           L.C. No.  LC00011 ——1484                        L.C. Date  Oct 02 2002 ——— 1493
       L.C. Remarks ——1485
  Issuing Bank Name  ABC International Bank ——1486
        Airline Name ——1487
L.C. Description of Goods  Plastic Resin Tracking
| Date | Nov-01-2002 15:00:00 GMT | Notes | Certificate Generated and Included with Shipping Documentation. |——1494

INSURANCE CLAIM  — 224

Submit  Cancel — 221      428 — Preview Doc | Send Doc

Add Notes to Page Log  | Assign Action | Approval Status
222                    | J Mizushima ▼ | In Progress ▼
                       | Current Action: 223 | Current Status: 225
                       | J Mizushima   | In Progress

SETUP
SUMMARY

ORDER
- ☑ EDI Sales Order
- ☑ Compliance Check
- ☑ Insurance Certificate

SHIPMENT
- ☑ Booking Info
- ☑ Export Shipping Instructions
- R Packing List
- ☑ Export Customs
- R Bill of Lading
- ☑ Manage Docs
- ☑ Import Shipping Instructions
- ☑ Import Customs
- ☑ Proof of Delivery

SETTLEMENT
- R Letter of Credit
- R Invoice
- ☑ Manage Docs
- ☑ Reconciliation
- ▣ Insurance Claim
- ☐ Remittance Advice Summary | Filing | Tracking | Page Log — 1727

Claim No       IC-000001 — 1731
Claim date     Mar 01 2002 — 1732
Estimated Loss Amount  2,500.00 — 1733
Current Cargo Location  Port of Charleston, NC — 1734
Loss Description  Damaged Container — 1735

Loss Date      Nov 29 2002 — 1736
Currency       USD — 1737
Arrival date   May 02 2002 — 1738

Claimant — 1741
Name          Global ImpEx
Address1      11 Down Street
Address2      Suite 1900
City          New York
State/Province New York
Postal Code   10011
Country       United States
Notes
Contact Name  Hank McArthur
Telephone     212-555-1212

Reporting Party — 1742
Name          Global ImpEx
Address1      11 Down Street
Address2      Suite 1900
City          New York
State/Province New York
Postal Code   10011
Country       United States
Notes
Contact Name  Hank McArthur
Telephone     212-555-1212

Policy Type             OpenPolicy — 1431         Policy No              ICP-000001 — 1432
Policy Effective Date   Jan 01 2002 — 1433        Reference No           BR00001 — 1751
Insurance Certificate No.  IC1000789 — 1434       Insurance Certificate Date  Nov 01 2002 — 1436
Insured Amount          87,680.00 — 1439          Currency               USD — 1441

Tracking
Date  Nov-01-2002 15:00:00 GMT    Notes  Certificate Generated and Included with Shipping Documentation. — 1750

— 1410

| Source Doc Field | Source Doc Type | Source State | Destination Doc Type | Destination Doc Field | Dest State | Update Scope | Pre-condition |
|---|---|---|---|---|---|---|---|
| applicant-address1 | loc.settlement.trade | 4 | invoice.settlement.trade | customer-address1 | 2 | 3 | |
| applicant-address2 | loc.settlement.trade | 9 | invoice.settlement.trade | sold-to-address2 | 1 | 3 | |
| applicant-city | loc.settlement.trade | 9 | invoice.settlement.trade | sold-to-city | 1 | 3 | |
| applicant-country | loc.settlement.trade | 4 | invoice.settlement.trade | customer-country | 2 | 3 | |
| applicant-name | loc.settlement.trade | 9 | invoice.settlement.trade | sold-to-name | 1 | 3 | |
| applicant-state | loc.settlement.trade | 9 | invoice.settlement.trade | sold-to-state | 1 | 3 | |
| beneficiary-address1 | loc.settlement.trade | 9 | pl.logistics.trade | buyer-address1 | 1 | 3 | |
| beneficiary-city | loc.settlement.trade | 9 | pl.logistics.trade | buyer-city | 1 | 3 | |
| beneficiary-country | loc.settlement.trade | 4 | bol.logistics.trade | shipper-country | 2 | 3 | |
| beneficiary-name | loc.settlement.trade | 9 | pl.logistics.trade | buyer-name | 1 | 3 | |
| beneficiary-notes | loc.settlement.trade | 4 | bol.logistics.trade | shipper-notes | 2 | 3 | |
| beneficiary-zip | loc.settlement.trade | 4 | bol.logistics.trade | shipper-zip | 2 | 3 | |
| consignee-address1 | loc.settlement.trade | 3 | bolgtn.logistics.trade | consignee-address1 | 1 | 3 | LOCTradeExists |
| consignee-city | loc.settlement.trade | 9 | esi.logistics.trade | consignee-city | 1 | 3 | |
| consignee-name | loc.settlement.trade | 3 | bolgtn.logistics.trade | consignee-name | 2 | 3 | LOCTradeExists |
| consignee-state | loc.settlement.trade | 4 | bol.logistics.trade | consignee-state | 2 | 3 | |
| country-of-origin | loc.settlement.trade | 4 | bol.logistics.trade | country-of-origin | 2 | 3 | |
| delivery-terms | loc.settlement.trade | 9 | invoice.settlement.trade | delivery-terms | 1 | 3 | |
| detailed-description-of-goods | loc.settlement.trade | 9 | pl.logistics.trade | detailed-description-of-goods | 1 | 3 | |
| freight-charges | loc.settlement.trade | 4 | bol.logistics.trade | intl-freight-charges | 2 | 3 | |
| lc-date | loc.settlement.trade | 9 | pl.logistics.trade | lc-date | 1 | 3 | |
| lc-no | loc.settlement.trade | 4 | bol.logistics.trade | lc-no | 2 | 3 | |
| letter-of-credit-remarks-bol | loc.settlement.trade | 4 | bol.logistics.trade | letter-of-credit-remarks-bol | 1 | 3 | |
| letter-of-credit-remarks-invoice | loc.settlement.trade | 9 | invoice.settlement.trade | letter-of-credit-remarks | 1 | 3 | |
| notify-party-address1 | loc.settlement.trade | 4 | bol.logistics.trade | notify-party-address1 | 2 | 3 | |
| notify-party-country | loc.settlement.trade | 9 | esi.logistics.trade | notify-party-country | 1 | 3 | |
| notify-party-name | loc.settlement.trade | 4 | bol.logistics.trade | notify-party-name | 2 | 3 | |
| notify-party-state | loc.settlement.trade | 3 | bolgtn.logistics.trade | notify-party-state | 2 | 3 | LOCTradeExists |
| notify-party-zip | loc.settlement.trade | 9 | esi.logistics.trade | notify-party-zip | 1 | 3 | |
| ship-from | loc.settlement.trade | 4 | bol.logistics.trade | port-of-loading | 2 | 3 | |
| ship-to | loc.settlement.trade | 9 | pl.logistics.trade | place-of-discharge | 1 | 3 | |

Fig. 18

SYSTEMS AND METHODS TO SUPPORT APPROVAL TO SETTLE AN INTERNATIONAL TRADE FROM A CREDIT FACILITY, SUCH AS A LINE OF CREDIT OR A DEMAND DEPOSIT ACCOUNT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

RELATED APPLICATIONS

This application is related to the commonly owned U.S. patent application Ser. No. 10/776,079, entitled "Negotiation and Fulfillment of Insurance Conditions and Release of Goods for Export" by inventors Graham R. F. Napier, Steve M. Viarengo and Manoj Narayan, filed on the same day as the present application, and owned by the same assignee now and at the time of the invention. That co-pending application is incorporated by reference as if fully set forth herein. In addition, this application is related to and incorporates by reference the U.S. application Ser. No. 10/228,158, filed Aug. 26, 2002, entitled "SYSTEMS AND METHODS TO SUPPORT IMPORT-EXPORT TRANSACTIONS", and U.S. application Ser. No. 10/287,447, filed Nov. 4, 2002, entitled "SYSTEMS AND METHODS FOR PRODUCING DOCUMENTARY CREDIT AND CONFORMING SHIPPING DOCUMENTS".

REFERENCE TO COMPUTER PROGRAM LISTING APPENDIX

A computer program listing appendix comprising of an electronically-submitted pdf file named "Fig_18_Supp" containing synchronization rules, accompanies this application and is incorporated by reference.

BACKGROUND OF THE INVENTION

The present invention relates to systems and methods to support import-export transactions. More particularly, it includes methods and systems for negotiating terms for settlement of an international shipment, for advising an agreed bank that the terms have been met and for remittance from a line of credit or similar credit facility.

International import-export transactions may involve many actors, including exporters, export freight forwarders, import freight forwarders, and importers. In addition, they may involve customs brokers, transportation companies, and warehousing companies. Transportation companies may operate ships, planes, trains or trucks. While companies handling small packages, such as Federal Express or UPS, have integrated systems for handling and advising customers regarding their processing of domestic shipments of goods, from pickup to delivery within their own transportation networks, there is no collaborative integrated system for handling import-export transactions through multiple independent actors.

The cycle for global trade transactions may be slowed by the flow of information, the flow of goods or the flow of funds. The separate software systems of the typical actors, such as ERPs, compliance systems, transportation management systems, customs broker systems and banking and trade settlement networks are not well-suited to expediting these flows of information, goods or funds among the actors.

In the settlement of international trades, it has long been recognized that processes of documentary credit issuance and redemption are fraught with opportunities for error and resulting frustration. For instance, Tozzoli et al. in U.S. Pat. No. 6,151,588 comment in column 3 on how an issuing bank requires that all of the documents called for in a letter of credit exactly correspond with the terms of the letter of credit, and withholds payment to the seller even due to typographical errors and minor misspellings, with resulting frustration to sellers seeking payment. Tradecard, Inc., the assignee of the '588 patent, responded to this and other long-identified problems with documentary credits by creating an alternative funding mechanism, which is described in the '588 patent and their "Financial Supply Chain Automation: The Missing Link in Supply Chain Management White Paper" (PDF file created 29 April 2002) available from their web site www.Tradecard.com. Tradecard sidestepped the documentary credit problems by creating a new financial instrument and arrangement. However, banks are slow to adopt new financial instruments.

Accordingly, an opportunity arises to devise methods and systems that facilitate payment using familiar financial instruments, such as payment from a line of credit.

SUMMARY OF THE INVENTION

The present invention relates to systems and methods to support import-export transactions. More particularly, it includes methods and systems for negotiating terms for settlement of an international shipment, for advising an agreed bank that the terms have been met and for remittance from a line of credit or similar credit facility. Particular aspects of the present invention are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 depicts collection of data describing a purchase order. Information can be collected electronically, for instance conveyed by SOAP message with XML encoding.

FIG. 7 depicts a reconciliation screen, from which a reconciliation process can be triggered.

FIG. 8 illustrates access to document management.

FIG. 10 is a remittance advice screen that the bank may use to advise that the exporter has been or is being paid.

FIG. 11 shows a completed status summary panel.

FIG. 12 identifies persons assigned to fulfill various roles and carry out tasks recognized by the system.

FIG. 13 depicts the status screen, with attention drawn to the insurance certificate column.

FIG. 14 depicts an interface adapted to entry of insurance certificate-related data.

FIG. 16 is another status screen that emphasizes an insurance claim column.

FIG. 17 depicts an interface adapted to entry of insurance claim-related information.

FIG. 18 is a part of a set of synchronization rules for one embodiment of the present invention.

Synchronization rules define how data is propagated from one document to other documents, including bank-required documents and shipping related documents. More generally, synchronization rules define how data is propagated from one document to other documents. FIG. 18 is a part of a set of synchronization rules for one embodiment of the present invention. Subsets of these rules also practice the present invention and may be very useful. Some of the rules in figure 18 relate to the environment in which a DC/LC system operates and apply the present invention beyond just DC or LCs. The rules depicted in FIG. 18 can be applied to any domain or to a selected domain, by associating them domain Ids (not shown.) The source and destination document types are types of document in which fields appear. These document types may include the types of documents described above or in the incorporated application. The field names are names of fields, for instance fields in summary or input form. The source and destination document states indicate the condition of document preparation in which the rule applies. In one embodiment, the states are encoded as: New 1; In-Progress 2; On-Hold 3; Complete 4; Cancelled 5; Locked 6; Pending-Approval 7; Approved 8; Confirmed 9; Not Existing 0; and Any 1. The rules sometimes can be simplified by being applicable to multiple states or by generalization of the state transitions that will trigger a search through or application of a rule. The update scope column indicates the scope in which an update to a field will be applied. In this example, scopes are 1, 2 or 3, corresponding to one trade, one services module or across trades and across modules. Different scopes can be applied to updates, depending on the precise software embodiment chosen for the present invention. In an environment in which a DC or LC is one form of payment, there may be transactions in which there is no associated DC or LC. Accordingly, there is redundancy among rules so that an alternate rule may be specified if no LC is associated with a transaction. The pre-condition "LOCTradeExists" corresponds to a rule that overrides other rules, in case a LC is associated with a transaction.

Figure 1:
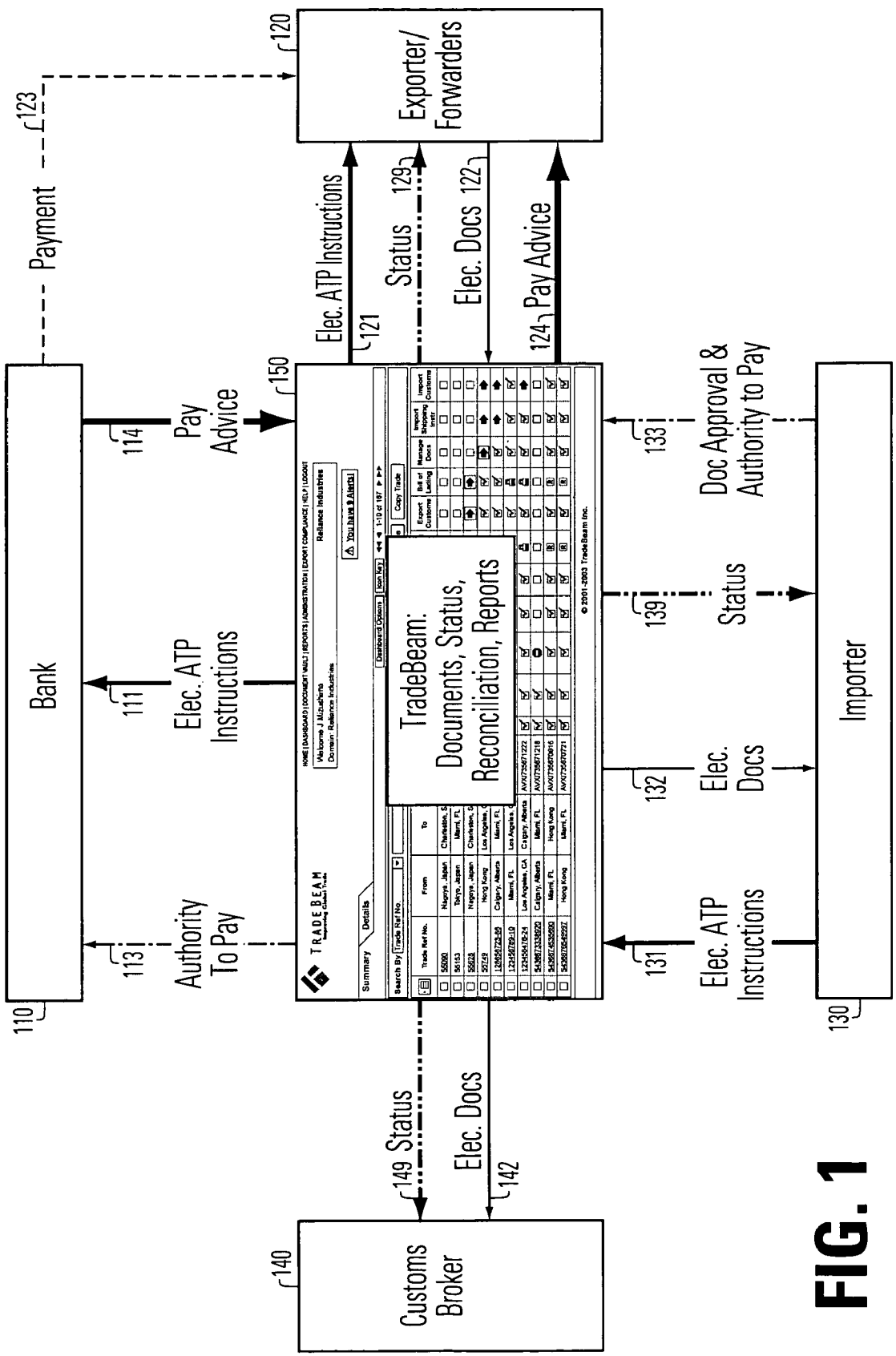
FIG. 1 schematically depicts, at a high-level, interactions among an importer, exporter, forwarders, customs broker and bank utilizing one embodiment of the present invention.

To look at a specific example of a synchronization rule, consider the first letter of credit to bill of lading rule. It is applied when the letter of credit is complete and the bill of lading is in the progress towards completion. The beneficiary-address1 field is copied from the letter of credit to the shipper-address1 field of the bill of lading. This mapping assures that the most current letter of credit information will be used for preparation of a pro forma bill of lading that the shipper may confirm or adopt. Similarly, the second rule maps the same files, when the letter of credit is received or approved and the bill of lading is in progress. The gray shading of the destination document field indicates that the system guards against the user who is preparing the bill of lading from overriding the wording of the letter of credit. This guarding may be implemented as a prohibition on changing the field, a role based prohibition, or a warning that requires an express override and records the override in the audit trail. The update scope of this rule is cross trade.

One motivation for synchronization is that a Letter of Credit typically requires a number of documents to be completed as proof that the buyer and seller have effectively completed the transaction to the satisfaction of all parties (themselves, customs, carriers, etc.). The completion and attachment of these documents is required to release funds. It is useful to support the following documents, which are sometimes used as proof that the transaction has been completed: Certificate of Inspection, Insurance Certificate, Ocean Bill of Lading, Air Waybill, Invoice, Bill of lading, Draft in duplicate and Certificate of Origin. The LC will specify which of these are required for documentary proof. When an LC is created, the required documents that must be completed should be specified. As a result of these documents being "linked" to the LC, business logic regarding downstream document creation and business rules will apply.

It is useful to support a handful of documents, without supporting all of the documents or supporting custom documents required by a LC. For example, it is useful to support an Invoice, Bill of Lading/Airway Bill and a Bill of lading. While these fields for these documents should be synchronized with the LC, there can also be discrepancies due to business process errors that take place during the course of a trade. An example might be the invoice indicating different spelling of a buyer's name, different from the LC. It is useful to allow these discrepancies to be overridden deliberately, as they might represent what actually is transpiring in the real world or other systems of record. Especially if LC data is uploaded from another third party source, instead of being entered as the basis for an LC application, care should be take as to whether system values for buyer's name, etc. should be overwritten for a particular LC.

Certain fields that should be shared across these documents. For preparation of an invoice, analysis of import-export situations indicates that the buyer's and seller's names and addresses should be synchronized from the LC, whether the LC is right or wrong, unless expressly overridden or the LC data is suspect. Terms of sale including place of terms of sale (FOB Charleston) should be synchronized. Goods description should match the LC exactly, but may contain added detail. LC number and issuance date optionally may be listed on the invoice. For preparation of a bill of lading, the buyer's and seller's names and addresses should be synchronized from the LC. Ship from, ship to names and address if any should match other documents and the LC. Pieces, weight, dimensions and cubic volume should match other documents and the LC. The goods description needs to only generally match LC in the bill of lading and may contain added detail. Alternatively, it may match the LC or match the LC with a field for additional detail. LC number and issuance date optionally may be listed on the bill of lading. For preparation of a BL/AWB, the shipper should default to seller (beneficiary) with an option to change to match a field in the LC. Consignee and Notify Party may be listed and should be consistent with any information provided to the bank (such information may be option, and not part of the LC even if included on an application form.) Pieces, weight, and cube on the BL/AWB should match the Bill of lading and LC. The goods description should generally match LIC and may contain added detail as required by Steamship Line/Airline. Alternatively, it may match the LC or match the LC with a field for additional detail. LC number and issuance date optionally may be listed on the BL/AWB. Freight Charges, including whether the charges are prepaid, collect or payable at destination, on the BL/AWB should not be inconsistent with the LC and Invoice. Place of Receipt, Port of Loading, Port of Unloading, Transship To, and Country or Place of Origin should not be inconsistent with the LC. Other carrier comments should appear as directed by LC.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

FIG. 1 schematically depicts, at a high-level, interactions among an importer, exporter, forwarders, customs broker and bank utilizing one embodiment of the present invention. The bank 110, exporter and forwarders 120, importer 130, customs broker 140 and system 150 are indicated by blocks. In general, the system 150 facilitates communications among these actors. Outside the system, payment 123 may be credited by the bank 110 to the exporter 120 through ordinary banking channels that are not part of the system 150. Otherwise, it is preferred for communications to flow through the system or to be noticed to the system for automatic processing, if other channels of communication are used. In the information flow depicted, electronic draft approval to pay instructions are communicated 131 from the importer or the importer's agents 130 to the system 150. Preliminary draft approval to pay instructions may be communicated 111 to the bank or not. Advice to the bank of draft or negotiated approval to pay instructions may be delayed until negotiations are complete, or advice to the bank may be dispensed with altogether. Unlike a letter of credit, the bank has little involvement between the importer and exporter in determining when a payment should be made from a line of credit. This substantially reduces the cost to the importer of financing the import-export transaction by eliminating the cost of issuing a traditional letter of credit and reducing the bank's role in determining whether to make a payment. Returning to the information flow depicted, the system 150 forwards 121 draft approval to pay instructions to the exporter or exporter's agents 120. Alternatively, the exporter or exporter's agents 120 could submit proposed approval to pay terms and conditions to the importer, for instance, using a prior transaction as a model. In practice, it seems more likely that the importer will prepare the first draft of instructions or terms and conditions, because the importer 130 holds the line of credit with the bank 110, from which the exporter 120 is paid. Following the draft approval to pay instructions, electronic documents are communicated 122, 132 between the importer and exporter. They optionally may be communicated 142 to a customs broker 140 or other participants or agents for either the importer or exporter. These documents may either confirm an agreement, carry out further negotiations, or implement parts of an agreement, for instance supplying documents that are formally required pursuant to an agreement. As indicated above, at some point, the system may manually or automatically advise the bank 110 of the agreed approval to pay conditions.

A variety of processes and process steps related to import-export typically take place between the negotiation of terms and conditions for payment and the issuance of an approval to pay from a line of credit or similar credit facility. Preferably, the system described herein is integrated with a system designed to facilitate import-export transactions from end-to-end, such as the system described in the co-pending U.S. application Ser. No. 10/228,158, filed Aug. 26, 2002, entitled "SYSTEMS AND METHODS TO SUPPORT IMPORT-EXPORT TRANSACTIONS", and U.S. application Ser. No. 10/287,447, filed Nov. 4, 2002, entitled "SYSTEMS AND METHODS FOR PRODUCING DOCUMENTARY CREDIT AND CONFORMING SHIPPING DOCUMENTS", which are hereby incorporated by reference. It may be advantageous to coordinate negotiation of terms and conditions for payment, tracking of circumstances that fulfill the terms and conditions for payment, and settlement in a single integrated system. For purposes of this invention, it may be enough to track the import-export transaction from negotiation through settlement, which sometimes precedes importation of the goods.

During the import-export process, the system 150 tracks the status of the transaction. Preferably, the status information that the system tracks, includes the information needed to determine when settlement should proceed. The system 150 preferably includes rules and logic that notify at least one user or role when the status information indicates that settlement should proceed. Throughout the importer-export process, the system 150 distributes status information 129, 139, 149 to the various actors. The particular status information distributed to the actors may depend upon their role and their authority to receive information. Status information further may include alerts when system wide or specifically set deadlines for action pass. For instance, if too long passes between when the bank is given approval to pay and when and the bank issues a payment advice, an alert may be sent to the importer for follow-up. Another system generated alert may flag delay between draft instructions and either agreement or proposed amendment to the draft instructions.

At some point, the importer or importer's agents 130 determine that a payment should be made. The system 150 assists the parties exporter in preparing appropriate documentation. The importer 130 communicates 133 to the system documentary approval to pay the exporter or exporter's agents 120. The system communicates 113 the importer's approval to pay to the bank 110. The bank responds with a payment 123 and a payment advice 114. The payment advice may confirm that payment has been made or may announce that payment is to be made either in the future or at a particular time or date. The payment advice 114 communicated to the system may be directly communicated 124 to the actors, such as the exporter 120, it may be encoded on a status screen 150, or both. When the bank makes the payment 123, it debits the importer's line of credit or similar credit facility. Use of the system 150 to convey authorization for payment provides security and comfort for the bank, whose actions are responsive to the system 150. Contractual terms may allocate any risk of the system being compromised or mistakes being made by users of the system. An arrangement for confirmation of an approval to pay, or an approval to pay exceeding a threshold, or an approval to pay particular listed or non-listed vendors may be provided to improve security.

Figure 2:
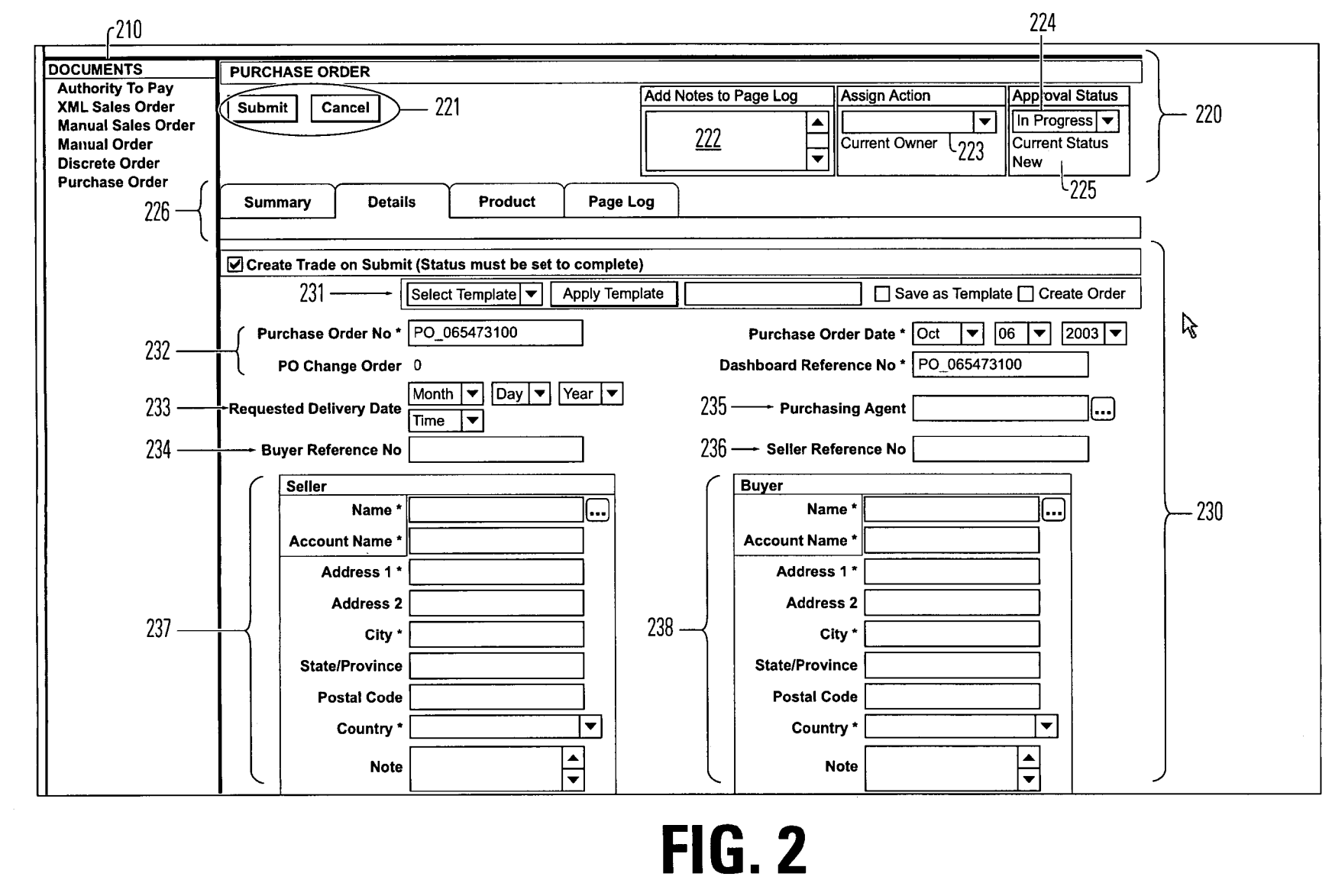

FIG. 2 depicts collection of data describing a purchase order. Information can be collected electronically, for instance conveyed by SOAP.message with XML encoding. A user can enter information, for instance using the interface depicted in FIG. 2, which is convey electronically to the system 150. It should be understood that the left frame and the main frame depicted in FIG. 2 may be combined with the navigation bar, context block, shipment description information and alerts display, which are depicted in and described in the context of other figures. The left frame 210 is one variation on presenting a consistent user interface throughout an import-export system. The navigation menu 210 in the left frame may be sensitive or responsive to the identity or role of the user, providing access to documents that the user may read, modify or approve. In this context, the documents listed are an authority to pay, as depicted in FIG. 3, an XML sales order, which imports an XML document, preferably conforming to a schema defined in a language such as XML Schema, a manual sales order, which corresponds to a user interface for data collection, and various types of orders that communicate an importer's intent to purchase from an exporter. The main frame is subdivided into a top section 220 and tabbed views 230. Submit and canceled controls 221 allow the user to decide whether to persist or save edits made using the interface. The add notes to page log panel 222 allows a user to annotate an audit trail that is compiled as users work on parts of the shipment. The assign action panel and current action identifier 223 identify the actor currently responsible for taking the next step in the present, purchase order process, and allows the user to reassign the current action or to assign the next action required. The approval status panel 224 and current status identifier 225 identify the current status of the present process and allow the user to update the status, according to the user's approval authorities. The tabs 226 allow direct access to user interfaces including summary, details, product and a page log. The page log displays the audit trail mentioned above, for the purchase order process. The remaining tabs are further described below.

The details view 230 describes some of the information useful in entering a purchase order. Depending on activities that preceded entry of a purchase order, selecting the submit button 221 may create a trade in the system, as opposed to adding information to a pre-existing trade. This interface provides support for templates 231. An existing template can be selected or a new template created. The name of the current template is displayed. The new template can be created when the data entry has been completed and submitted. An order can be created when the submit button 221 is selected. Information regarding a purchase order 232 can be entered in several fields. A purchase order number can be entered directly or automatically generated. A purchase order date can be entered or generated from a system clock or rule applied to the system clock. A purchase order changed number is consistently displayed, which most likely will be set to zero when the purchase order is first created. A unique dashboard reference number can be used by the system to keep track of transactions that may have non-unique purchase order numbers. When unique purchase order numbers are used, whether globally unique, unique between an importer-exporter pair, or for a single importer, the purchase order number may automatically be used as a dashboard reference number. The requested delivery date and time 223 may be entered. A purchasing agent 235 may be identified, for instance, by accessing a list or by typing with type-ahead assist. A buyer reference number 234 may be entered. A seller reference number 236 may be separately entered. The seller 237 and buyer 238 may be entered by including information such as name, account name, address and notes. Names may be selected, for instance by accessing a list.

Other views 230 accessible through the tabs 226 may include summary and product views. The summary view will include some or all information available in other views. The product view may provide access to fields related to products within the shipment such as container number, sequence number or product ID, description, quantity, packaging, unit weight, net weight, gross weight, seal number, pick up and package ID. Additional information may be accessible by scrolling right or left in the product view.

Figure 3A:
FIG. 3 depicts entry of approval to pay instructions or draft instructions.
Figure 3B:
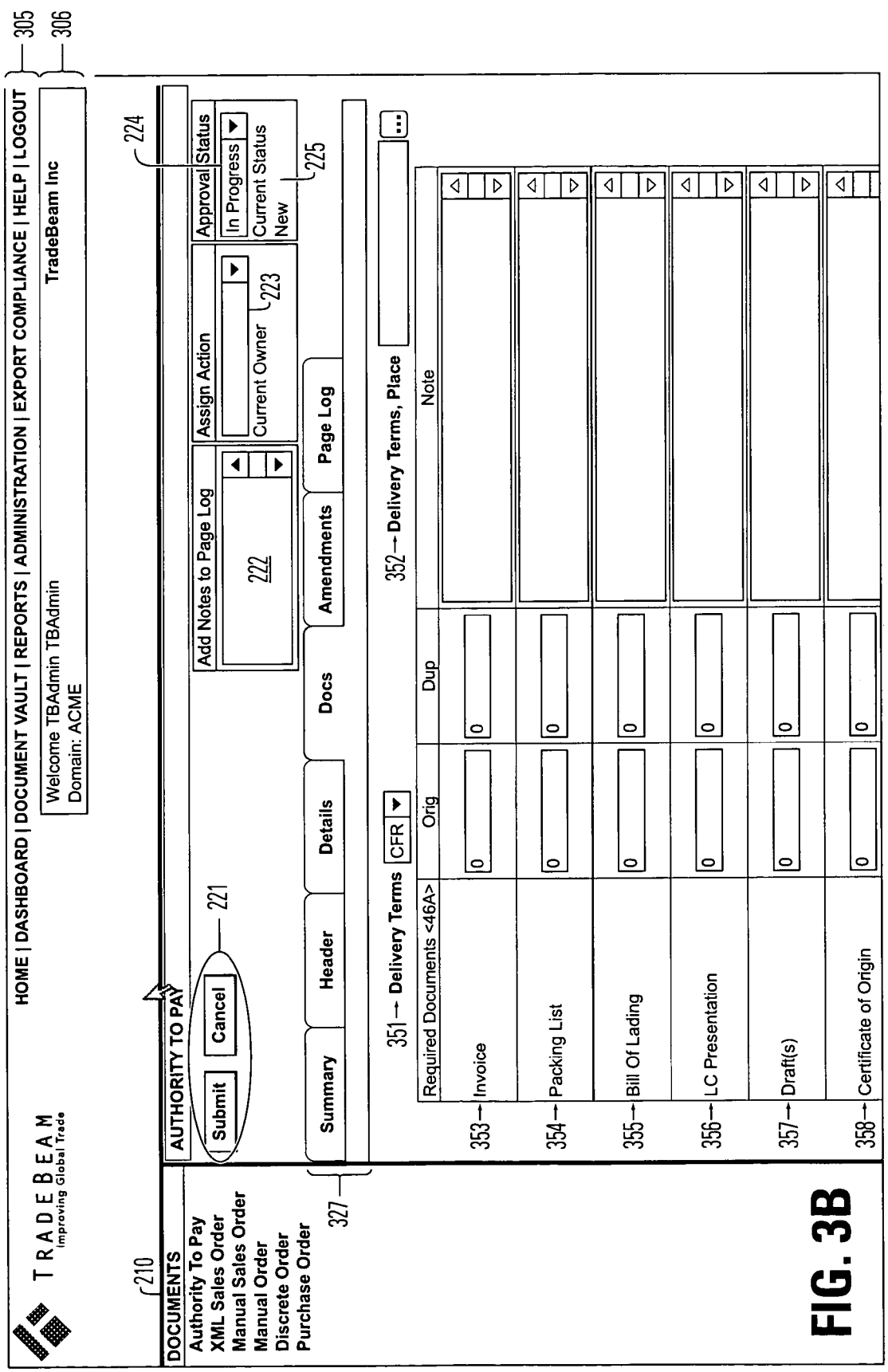

FIGS. 3A-3B depict entry of approval to pay instructions or draft instructions. The left panel 210 and the main panel follow the format of FIG. 2. This figure illustrates entry of approval to pay instructions using an exemplary user interface. Alternatively, an approval to pay instruction could be imported, for instance from a SOAP message carrying an XML payload. Several reference numbers in this figure are repeated from FIG. 2, presenting a consistent user interface across different screens. Additional features of the screen include a navigation bar 305 and a context block 306. The navigation bar links provide direct access to interface pages that are part of an environment in which the line of credit settlement system is useful. Navigation bar links include home, a dashboard that displays summary status, a document vault that stores, for instance, approval to pay instructions, a reports module, administration, export compliance checks, help and log out. The document vault handles messages, origination and receipt. The interface in this figure typically would be operating in the document vault. The context block 306 identifies the user, the user's company association and the particular portfolio in which the user is working. The new features of this figure appear in the main panel, under the header tab 327. The particular type of approval to pay document being prepared is indicated, for instance using radio buttons 332. While several document types are listed, for purposes of presenting a consistent interface, only the instruction type applies here, because an application is not needed for an ongoing line of credit. An advice, in one embodiment, is handled by a different screen. Amendments are accessible via a separate tab 327. A variety of information is collected for an approval to pay instruction. Fields that may not be operative on this screen include an instruction number 333 and corresponding date, an application number 334 and corresponding date, an advice number 335 and corresponding date and an amendment number 336 and corresponding date. These fields may appear grayed-out, to present a consistent user interface, or may be omitted. The approval to pay number 337 and corresponding credit issued date track an approval to pay. The user can enter a request issued date and a request expiry date 338, 339. User also can request a confirmation 340. Information regarding advising and issuing banks may be entered, 341, 342, including name, address and location of the bank. The bank may be selected from a list. The interface that begins as FIG. 3A continues as FIG. 3B, which illustrates use of the "Docs" tab 327. In this portion of the user interface, the user selects documents that may be required during the course of a shipment. The selection of documents may be sensitive to delivery terms 351. Delivery terms may be selected from a pulldown list of standard delivery terms, such as "F.O.B.", which stands for free on board, "C & F" or "CFR", which stands for cost and freight, "CIF", which stands for cost, insurance and freight, and "FAS", which stands for free alongside ship. Thirteen terms (INCO terms) recognized by the International Chamber of Commerce (ICC) may be supported by the system, or at least the applicable and frequently used terms. The 1990 standard list of terms included: EXW, Ex Work (Named Place); FCA, Free Carrier (Named Place); FAS, Free Alongside Ship (Named Port Of Shipment); FOB, Free On Board (Named Port Of Shipment); CFR, Cost And Freight (Named Port Of Destination); CIF, Cost Insurance And Freight(Named Port Of Destination); CPT, Carrier Paid To (Named Point Of Destination); CIP, Carriage And Insurance Paid To (Named Point Of Destination); DAF, Delivered At Frontier (Named Point); DES, Delivered Ex Ship (Named Port Of Destination); DEQ, Delivered Ex Quay Duty Paid(Named Port Of Destination); DDU, Delivered Duty Unpaid(Named Point Of Destination);

and DDP, Delivered Duty Paid (Named Point). Other standard terms also may be used, or may be specified as other terms. In this example, the system presents the user with document choices for required documents including invoice 353, packing list 354, bill of lading 355, drafts 357 and certificate of origin 358. It is unlikely that a letter of credit presentation field 356 would be used with a line of credit settlement. For each required document, the user has the option of entering quantities for original and duplicate copies of the document and for making notes about the document.

Figure 4:
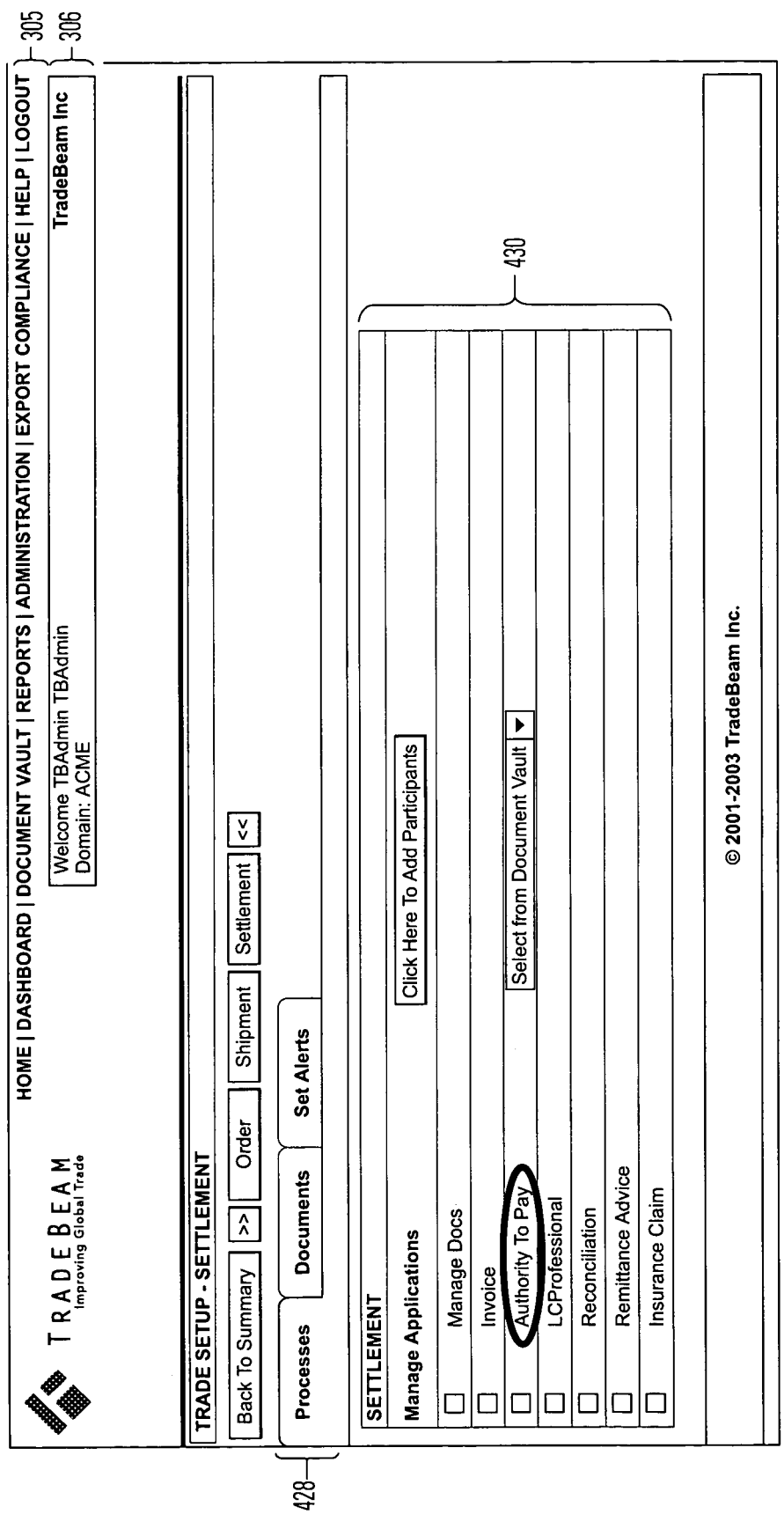
FIG. 4 depicts part of an interface for creating a trade with an approval to pay as part of the trade.

FIG. 4 depicts part of an interface for creating a trade with an approval to pay as part of the trade. The module selection section 420 allows the user to select between modules for ordering, shipping and settlement. These modules may be separate software packages that can be purchased individually or as a group. Within the settlement module, tabs are provided 428 for access to processes, documents and setting alerts related to settlement. The process tab provides access for selecting applications and adding participants. In one environment in which approval to pay logic is useful, the range of applications for settlement may include one or more of managing documents, invoicing, approval to pay, letter of credit, reconciliation, remittance advice and insurance clients. For approval to pay and, optionally, for other applications, a pulldown menu may provide access to a document vault which can be used for storage of templates, sample documents or actual documents that may be modified to create new ones. The creation of a trade using this and related interfaces as more fully explained in the applications that have been incorporated by reference.

Figure 5:
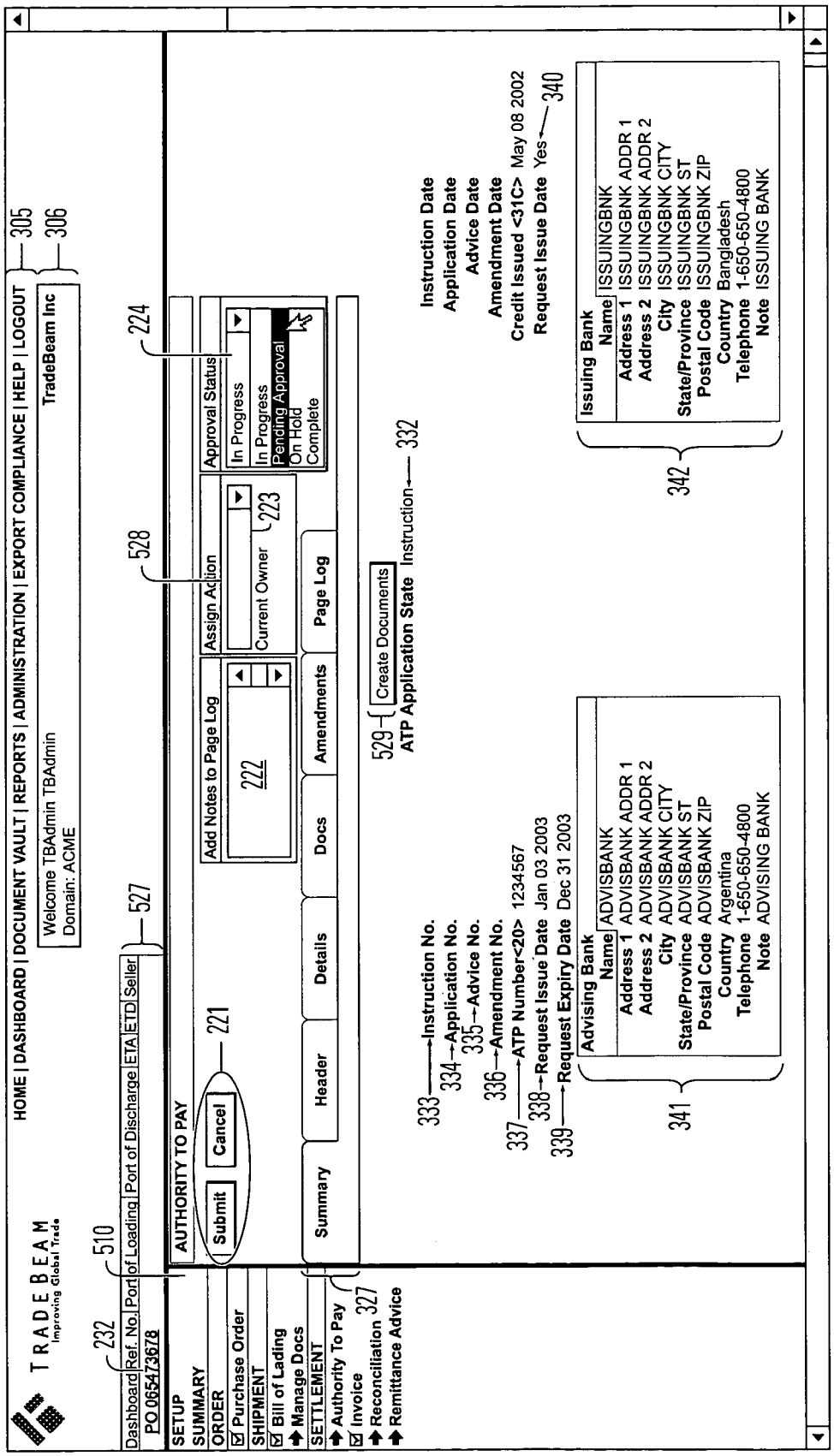
FIG. 5 depicts access to the approval to pay instruction as part of the workflow, as opposed to part of the set up for a shipment.

FIG. 5 depicts access to the approval to pay instruction as part of the workflow, as opposed to part of the set up for a shipment. The left panel changes, more detail is provided in the upper panel, and the top half of the main panel provides new options. The left panel 510 now lists steps in the workflow with workflow status icons next to step names. In this example, the check marks adjacent to purchase order, relating and invoice indicate that those steps in the workflow already have been completed. As might be expected, the approval to pay step follows invoicing. In the top panel, summary status information 527 is provided, which identifies the shipment that is being processed through workflow steps. A purchase order number 232 appears in the dashboard reference number area. Other information that may be provided includes port of loading, port of discharge, ETA, ETD and seller. Several controls are provided 528, 529 over creation, distribution and tracking of the approval to pay documents. Some controls 528 may allow a user to preview or send a document. User also may review of distribution log to see who has received a document. A prominently located control 529 is for creation of documents. Once a document set has been created, a particular user or particular role may have the option of retracting the documents. The approval status control 224, for instance, shows that one role is to approve the approval to pay documents. Another role is to place a hold or clear a hold on documents.

Figure 6A:
FIGS. 6A-6B show progress of a shipment through a workflow.
Figure 6B:

FIGS. 6A-6B show progress of a shipment through a workflow. This is a workflow in which the approval to pay technology may be particularly useful. The two figures use the same screen layout, which includes tabbed access 627 to summary and detail information, direct access to setting dashboard options 616 and quick access to a key for icons used on the screen 617. The screen layout further includes a search bar 610 that supports searching, creating trades and copying trades. Searchable fields are accessible through pull down menu 611. Search criteria are accessible 612 and work with a value entry field 613. A search can further be qualified by the shipment or trade status 614 and activated using a search button 615. The trade can be created from scratch 618 or by copying another trade 619. A shipment summary row 620 identifies a particular shipment and summarizes the status of that shipment. A particular row can be selected, for instance using a check box 621. It may be identified by a dashboard reference number 622, purchase order number or other identifying reference. Status columns may be provided for workflow steps, such as status of a purchase order 623, bill of lading 624, document management 625, approval to pay 626, invoicing, reconciliation 627 or remittance advice 628.

A variety of status conditions can be indicated. In one embodiment, "pending" status is indicated by a lightly colored square, such as a brown or gray square. This pending status may indicate that a shipment stage is not completed and not yet in progress. "To do" status is indicated by a boldly colored square, such as a green square. This to do status may indicate that the current user viewing the overview display should take some action to help complete a particular stage of shipment processing, so that it may advance to the next status. That is, a viewer who sees a green box knows the ball is in the viewer's court. "In progress" status is indicated by a brown arrow. This in progress status may indicate that a participant other than the current viewer is responsible for advancing a particular shipment stage. The responsible participant may be identified in a more detailed display linked to the icon. The in progress icon further may indicate that no alert date has yet passed for action by the responsible participant. "Done" status is indicated by a box with the check mark. This done status may indicate that all actions required to complete a stage have been accomplished. "Locked" status is indicated by a padlock icon. This locked status may indicate, for instance, that a stage involving production of documents is complete and not subject to further revision by any participant. In some embodiments, it may be possible to unlock a locked status. "Alert" status is indicated by an exclamation point in a triangle. This alert status may indicate that a milestone, for instance for preparation of a document or for movement of the shipment has passed "On hold" status may be indicated by flashing red words, a red octagonal shape symbolizing a stop sign, or both. This on hold status may indicate that a participant responsible for the shipment, overall, has temporarily suspended editing of data related to the shipment. This kind of temporary suspension may lock out all other participants from updating or even from viewing information about the shipment, until the hold is cleared.

FIG. 6A indicates that the purchase order has been submitted 623 and the approval to pay terms have been negotiated 626. The bill of lading is not complete, so preparation of an invoice is not yet pending. In FIG. 6B, completion of the bill of lading has triggered adding the invoice to the workflow. The invoicing is indicated to be complete. Additional work is required on managing documents, reconciliation and remittance advice. Both of these figures indicate that additional detail regarding workflow status is available by selecting the details tab 627.

Figure 7:
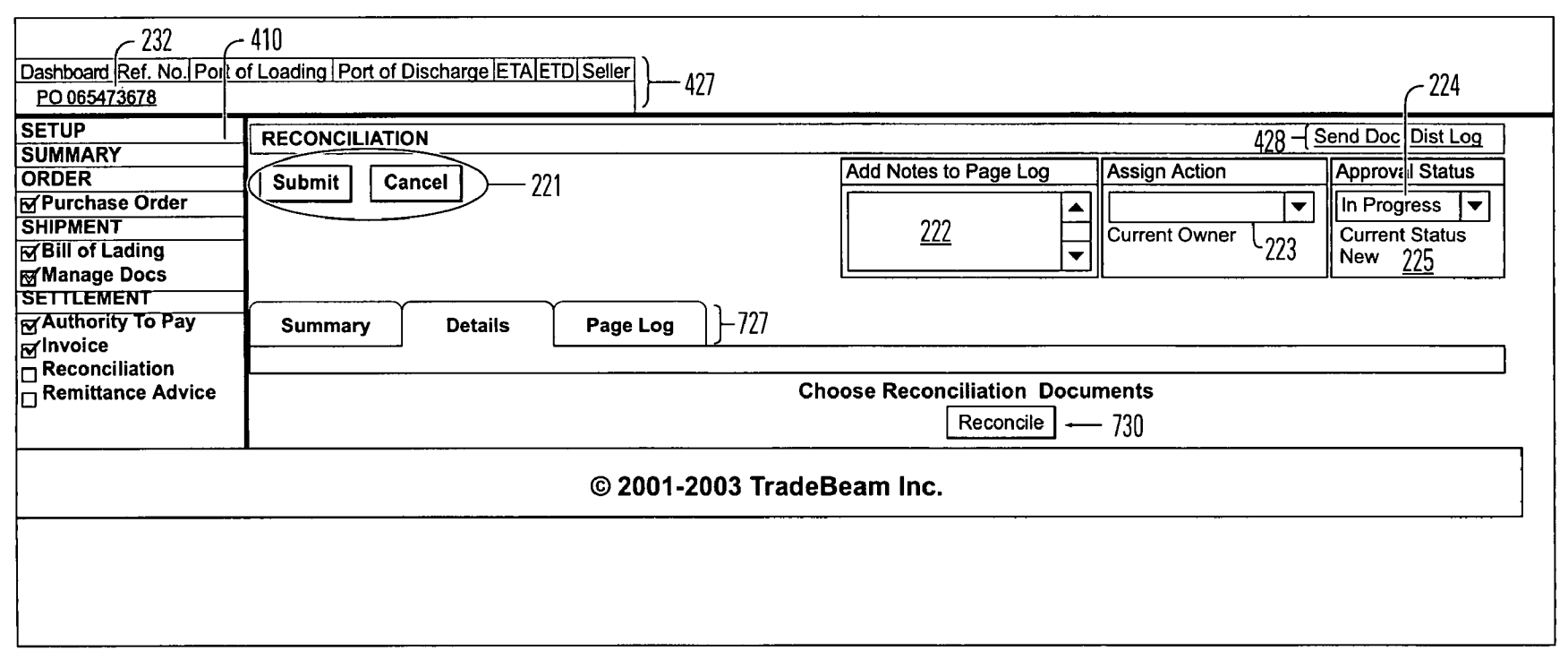

FIG. 7 depicts a reconciliation screen, from which a reconciliation process can be triggered 730. A reconciliation process provides a comparison of fields, for instance between a bill of lading and a purchase order, based on a field mapping.

Figure 8:
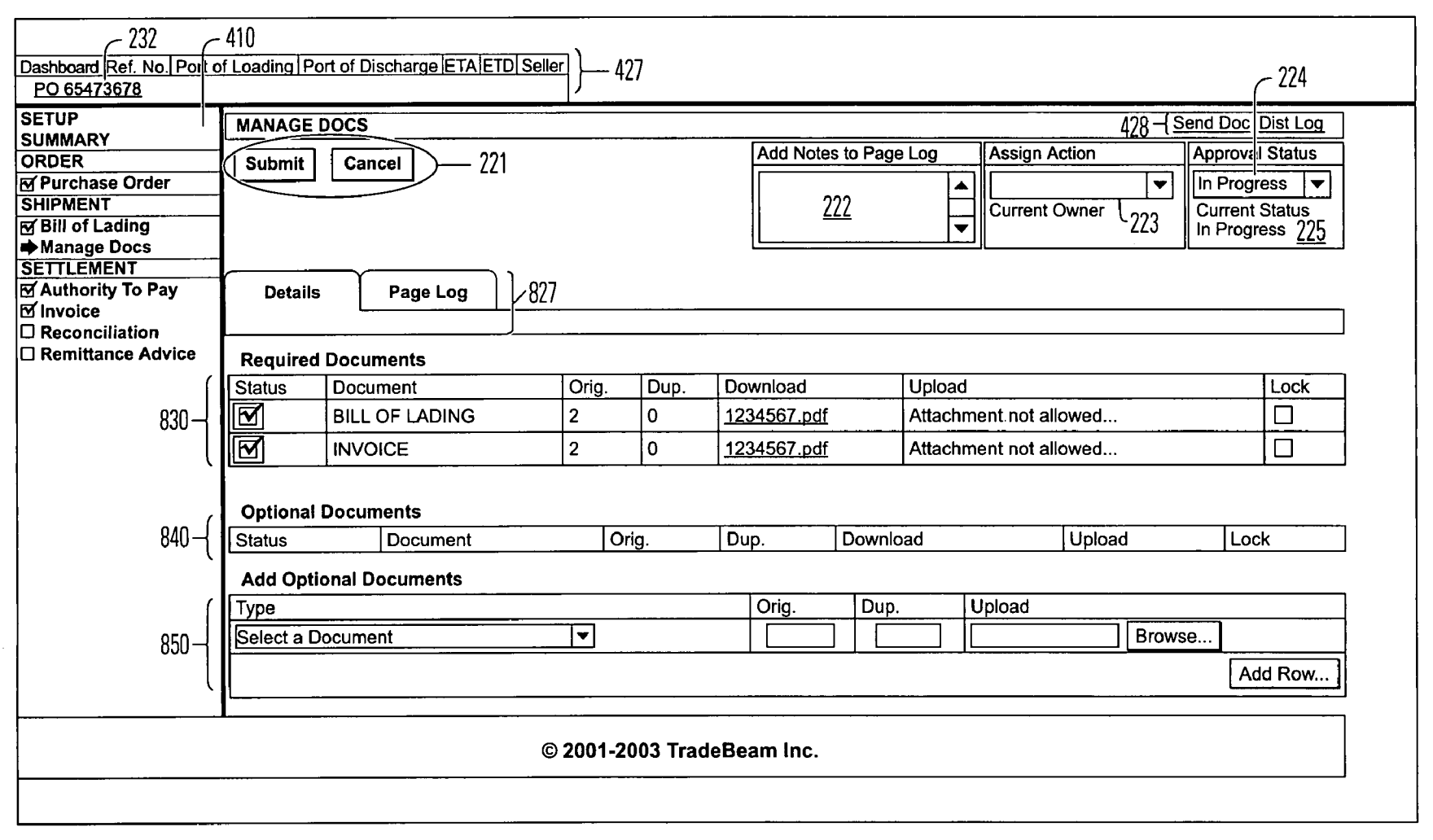

FIG. 8 illustrates access to document management. The tabs 827 and the main panel provide access to the details of document management and an audit trail or page log. One section of the main panel collects required documents 830. Required documents are specified when the trade is set up. In this instance, a bill of lading and invoice are required. These particular documents are system generated documents, archived in a convenient format, such as PDF. A hyperlink field or other control may be provided for authorized users or roles to download a copy of these documents. For some documents, uploading also may be permitted. Users or roles with certain authorities lock any of the required documents. Another section of the main panel collects optional documents 840. Optional documents can be added, using a third section of the main panel 850.

Figure 9:
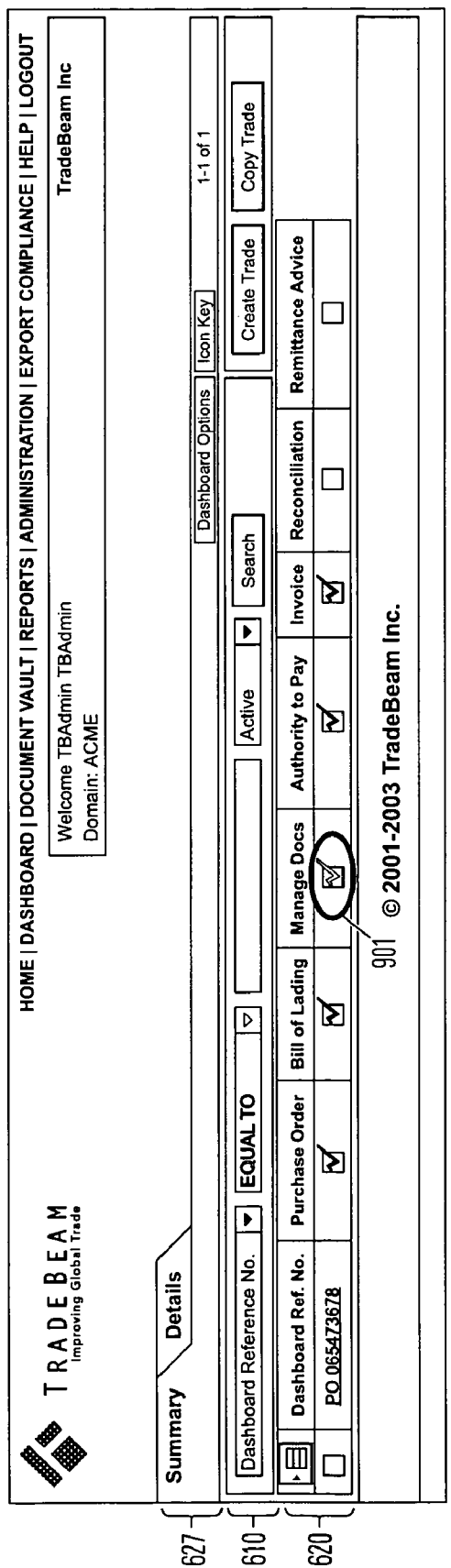
FIG. 9 shows further progress of the shipment through the workflow.

FIG. 9 shows further progress of the shipment through the workflow. This figure illustrates use of the same status panel as in FIGS. 6A-6B. In this figure, the managed document status 901 has been updated with a faded checkmark icon, which indicates that an approval is required. An approval may be required, for instance, when the system detects that all needed documentation regarding the shipment has been received that an approval to pay should be issued to the bank, based on the electronic status of earlier steps. One of the features the details tab 627 may be to indicate who is responsible for making the approval or taking the next step.

FIG. 10 is a remittance advice screen that the bank may use to advise that the exporter has been or is being paid. Preferably, the screen is integrated at some level with the bank's processing systems for electronic payment. Integration may be complete, so that one screen triggers two processes. Or, one system may be primary and export data to the other. The export may be automated, as by some sort of Web services protocol or save to disk and import facility, or may be a form completion assistant, allowing an intelligent, field-oriented copy and paste facility. This figure illustrates information accessible behind the details tab 1027. Most of the available fields are explained by their names: payment advice type 1031 is "Bank"; payment advice purpose 1032 is optional; payment settlement date 1033, total amount due 1034, total amount paid 1035 and currency 1036 are available fields. The payment method 1037 may be selected from a pick list, for instance a choice among wire transfer, feds transfer, ACH, check, and open account—meaning a deposit to an exporter's account at the bank. A payment reason code 1041 is optional. Payment advice number 1042, bank approval date 1043, bank charges 1044, and other charges 1045 preferably tie to similar fields in the bank's processing systems. Remarks 1046 are optional. Additional reference numbers that may be used with the payment advice include bank reference number 1047, invoice reference 1048, approval to pay number 1049 (from the importer or importer's agent), and a general other reference number 1051. Another portion of the main panel 1060 includes rows for reconciling the payment with other detail, such as order and line item numbers. The amount due, paid and any difference can be explained with a reason for the difference. One or more rows can be deleted, for instance if the payment advice is prepared from a template.

Figure 11:
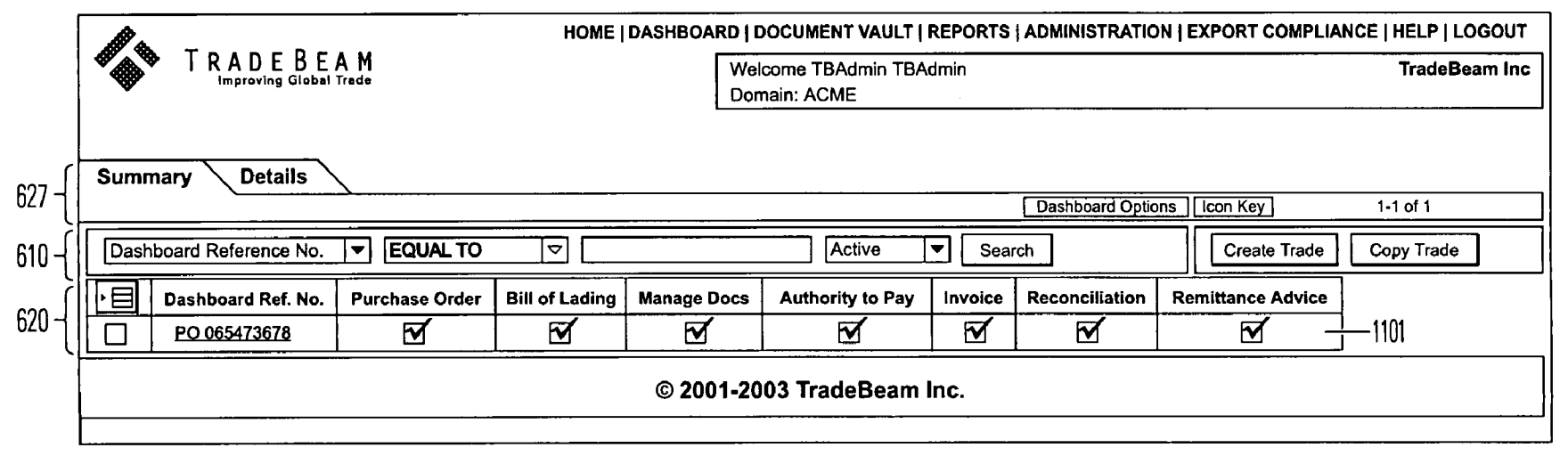

FIG. 11 shows a completed status summary panel 1101 using the same status panel as FIGS. 6A, 6B and 9.

FIG. 12 identifies persons assigned to fulfill various roles and carry out tasks recognized by the system. Security authorizations for persons are also displayed, including authority to read, modify and approve ("RMA") various tasks. In this figure, a template can be accessed to set roles and task responsibilities from a pick list or other window 1201. Separate panels or sections of the screen are provided: for template and save actions 1231, participant names, titles, roles, companies and trade administration responsibility 1240; for ordering tasks and participants 1250; for shipment tasks and participants 1260 and for settlement tasks and participants 1203. The tasks may be click-linked to software applications that implement the tasks, some of which are described in this application and the related applications. Attention is drawn in this figure to insurance-related tasks. During ordering, an insurance certificate 1202 must be generated, evidencing agreement on and compliance on terms of insurance. During settlement, an insurance claim 1203 may need to be processed, depending on the condition of the goods received and, potentially, on the timing of receipt.

Figure 13:
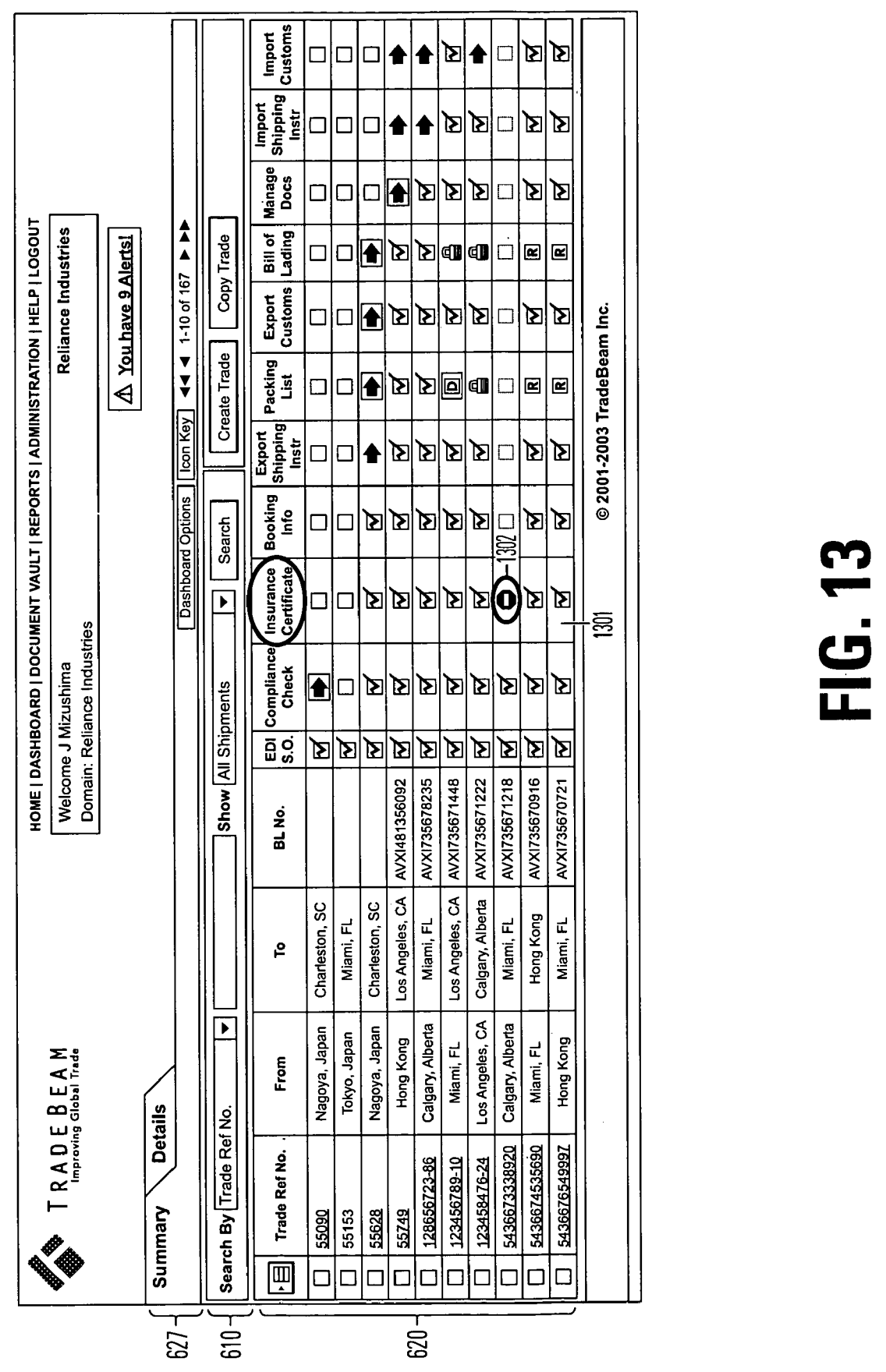

FIG. 13 depicts the status screen, similar to that depicted in FIGS. 6A-6B. Sections of this screen 610, 620, 627 are the same as in FIG. 6. Attention is drawn in this figure to the insurance certificate column 1301 of the status display. Three insurance certificate statuses are indicated by the icons. A pair of trades have open boxes, indicating that satisfaction of insurance certificate conditions remains to be accomplished. Most of the trades have check marks in boxes, indicating that the certificate conditions have been satisfied. One trade has a stop sign icon 1302, which indicates that the trade is been put on hold due to an insurance certificate issue. This hold has been manually placed on the trade, following review by a person having appropriate authorities to issue a hold. In addition to the icons in the insurance certificate column 1301, two icons in the packing list column have not previously been described. One icon is a boxed "D", which stands for disputed or discrepancy. During reconciliation, a difference between an order and the packing list or between a packing list and goods received, for instance, was identified. A person with authority to flag the dispute or discrepancy approves setting this flag. Another icon is a boxed "R", which stands for reconciled. During reconciliation, the documents being reconciled were considered to match. This matching and flagging may be reviewed and approved by a person or automatically applied by the system.

FIG. 14 depicts an interface adapted to entry of insurance certificate-related data. Insurance coverage generally begins at the time goods or pickup from the warehouse or storage location specified in the policy. Coverage continues through transit and ends on delivery to the consignee's warehouse is specified in the policy, to any warehouse be assured has chosen for delivery, or 60 days after dockside discharge from the vessel at the final destination port. Policies may carry clauses to override these rules, particularly for the time limit after discharge.

The assured has an obligation to minimize the raw risk of loss or damage, and to file claims against the carrier or other party that may be responsible for the loss before filing a claim. If a claim is to be filed, the insurer or claim agent is to be notified immediately. The insurer appoints a marine surveyor to inspect the cargo and report on the nature the loss, the value and the extent of the loss. In some cases, the surveyor may be named in the insurance policy. The surveyor issues a Certificate of Loss or Certificate of Survey along with a report on findings to the consignee. The surveyor's fee may need to be aid by the consignee, but may be refunded if covered by insurance policy.

When making claim, the following documentation is generally required: original insurance policy or insurance certificate; original bill of lading; commercial invoice; packing list; certificate of loss or certificate of survey; the weights notes or landing account issued at the destination; any correspondence with the carrier or other party responsible for the loss or damage; a master's protest, which is a written description by the ship's master of any disaster, accident or injury at sea that may be related to the claim. With such a detailed process for filing claims and extensive list of documents, many of which may be tracked by an integrated system, an insurance claim module to an integrated system is particularly appealing.

Most the fields depicted in FIG. 14 are populated with data entered to set up the import-export transaction. For instance, shipper fields 1460, fields 1444-1475 and fields 1481-1493 contain data that can be used across many modules of an import-export system. In this figure, the left panel 1410 lists steps in the workflow, with workflow status icons next to the step names. In this example, the check marks adjacent to EDI sales order, compliance check and letter of credit indicate that those steps in the workflow already have been completed. The boxed arrow adjacent to insurance certificate indicates that an insurance certificate needs to be processed. The top section in the interface depicts controls previously explained in relationship to FIG. 2 and FIG. 4. A consistent appearance is presented by the tabs 1427, which allow direct access to user interfaces including summary, details, parties, tracking and page log. The summary view describes some or all of the information related to an insurance certificate. The insurance certificate module electronically interfaces with other modules to collect data and populate fields, to tie the insurance certificate to a particular trade and/or to collect additional information required to document an insurance certificate. Optionally, the system can generate an insurance certificate based on arrangements with insurance brokers who are authorized by law to place insurance coverage as required. Several fields relate particularly to the insurance coverage. Policy types 1431 include open policy, which applies across several transactions and special cargo, which applies to an individual transaction. A policy number 1432 may be issued by the agent who binds coverage or by the security provider. The policy effective date 1433 typically matches the agreed terms for insurance to cover the import-export transaction. The certificate reference number 1434 and insurance certificate number 1435 are numbers used by the issuers of the certificate and/or policy. Contrary to the example shown here, the insurance certificate date 1436 typically precedes or is in close succession to the policy effective date. Different terms may be negotiated between the importer and exporter, but the certificate is much more meaningful in a workflow if it is received prior to shipping. Coverage is unlikely to be effective prior to shipping. Insurance certificate place 1437, amount 1439, currency 1441 and amount in words are self-explanatory fields. The war risk field 1438 indicates whether the certificate extends coverage to war risks. Similar fields might be provided to indicate whether coverage is provided for acts of terrorism and other specialty risks. An additional covered risk field 1443 will reflect the negotiated requirements for coverage between the importer and exporter and any additional, non-standard or particularly important coverages that may have been obtained. The insurance conditions 1476 and special conditions 1477 typically reflect conditions imposed by any insurer on a policy that vary the law that otherwise would apply to insurance coverage. For instance, the example insurance condition 1476 would typically shorten the statute of limitation for making a claim. The special condition 1477 imposes a special requirement for merchandise carried in a container on the deck of a ship. The tracking field 1494 provides information regarding processing of the insurance certificate. As indicated above or in the documents incorporated by reference, many other fields provide information shared between the insurance certificate module and other import-export system modules.

Figure 15:
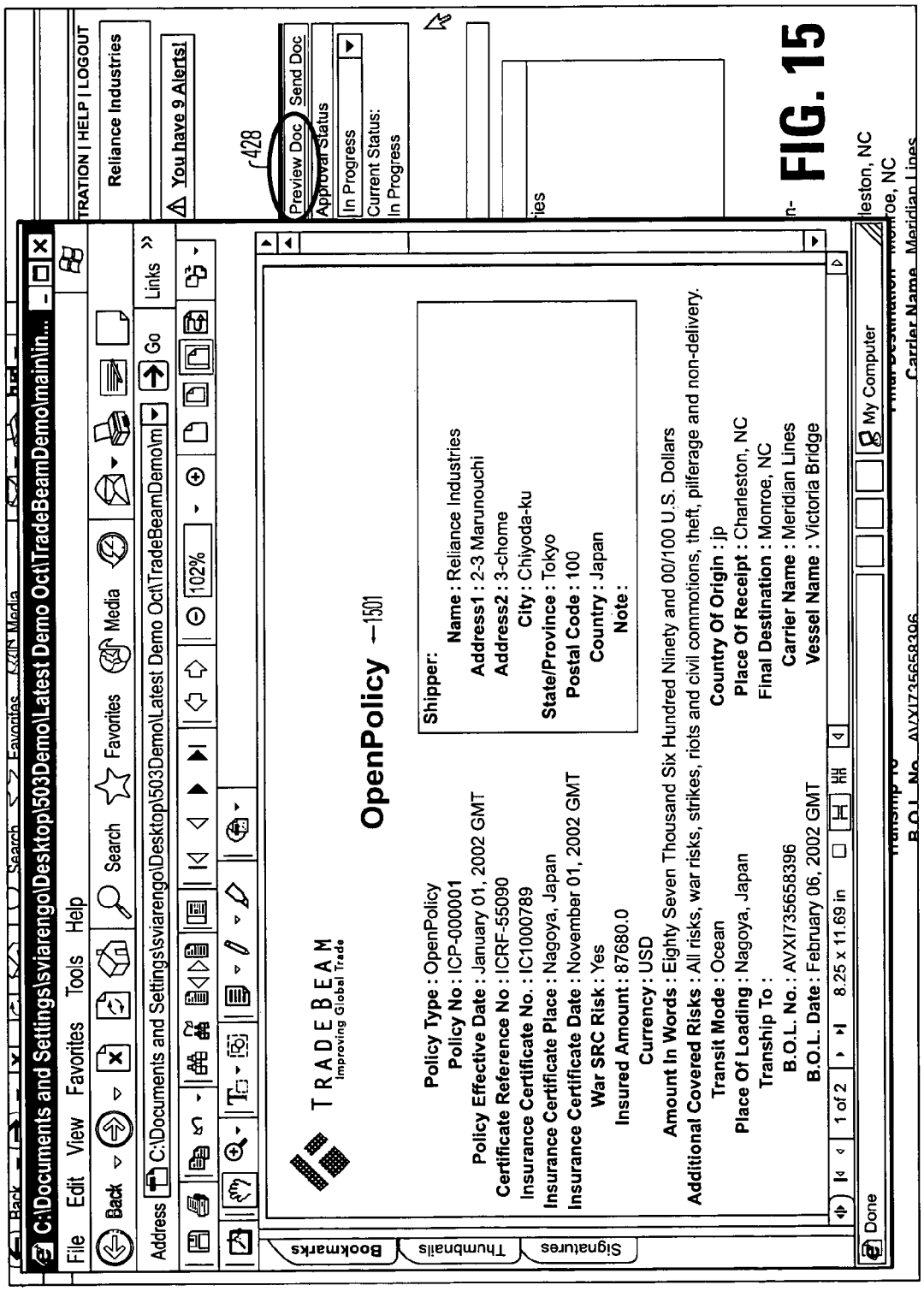
FIG. 15 illustrates an insurance certificate.

FIG. 15 illustrates an insurance certificate. The preview document link 428 of FIG. 14 invokes a facsimile of an insurance certificate 1501. This document is evidence that the system is been authorized to provide confirmation that an open policy type insurance policy has been procured. The quantities in this certificate, when the insurance certificate module is part of an integrated system, may be rolled up from data on a packing list, pull list or similar document, based on quantity and unit of measurement, because the insurance certificate typically is less detailed than the packing list, at the item detail level. This document may be maintained in some kind of portable format, such as "PDF" format, which is readable on a variety of computer systems. Optionally, the document may be locked against editing. The import-export system may use a document manager to maintain this and similar documents that are part of the workflow.

Figure 16:
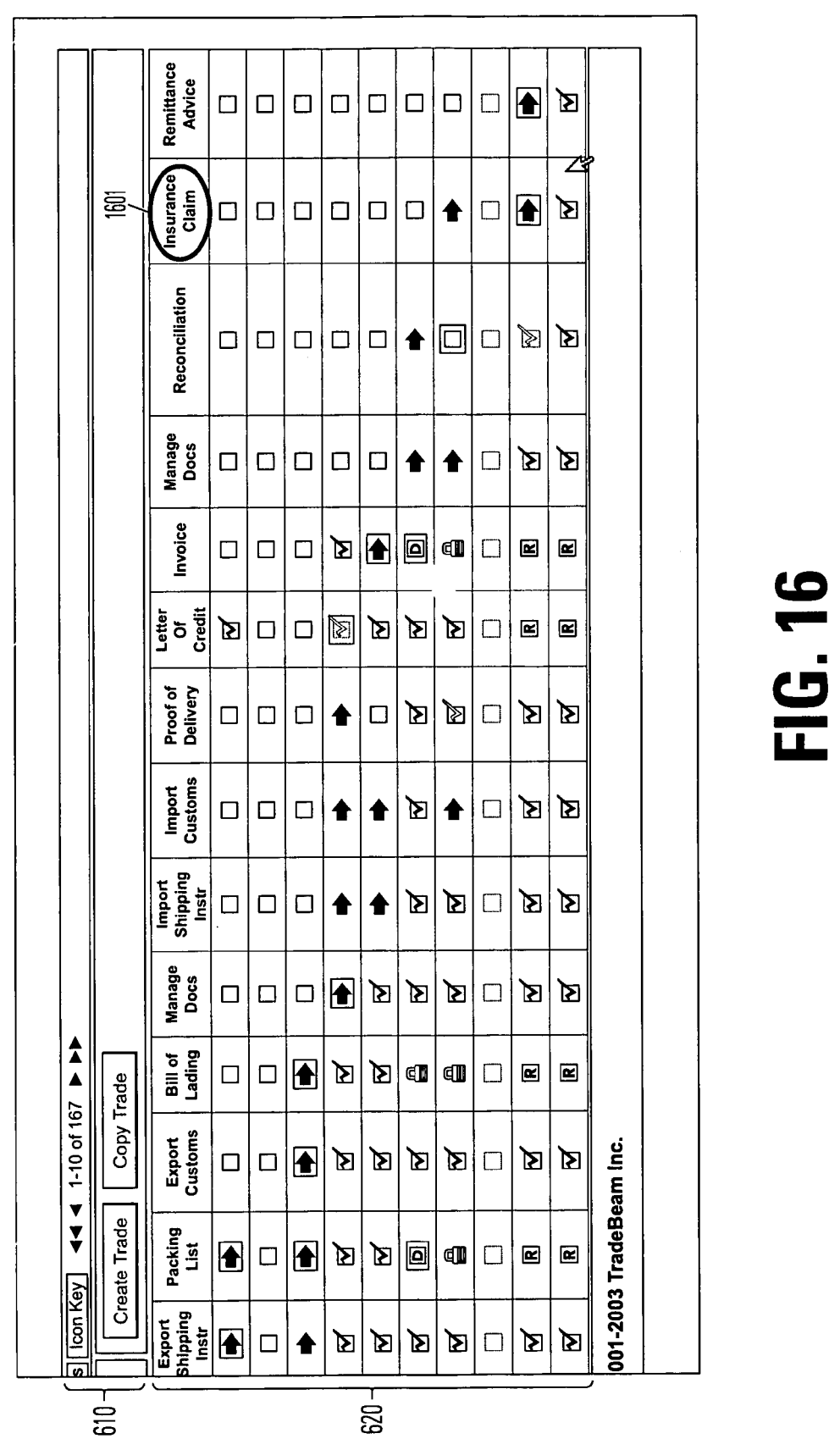

FIG. 16 is another status screen that emphasizes an insurance claim column 1601. The main portions of this screen 610, 620 are as previously described with respect to FIG. 6.

FIG. 17 depicts an interface adapted to entry of insurance claim-related information. The left pane 1410, the top section and tabs 1727 are familiar from other user interfaces. This tabs section 1727 provides direct access to summary, filing, tracking and page log interfaces. The summary interface depicted includes some or all of the information relevant to an insurance claim. The insurance claim fields 1731-1742 are particular to an insurance claim. The policy information 1431-1441 may be repeated from the insurance certificate module, if the insurance claim and insurance certificate modules are both implemented, or it can be entered separately. The tracking information 1750 parallels the tracking information 1450 in FIG. 14. Among the insurance claim-specific information, the claim number 1731 will typically be generated by the system or by a party authorized to receive the claim. The claim date 1732 corresponds to the date on which the system submits the claim. The estimated loss 1733 is provided by the claimant, as are the current cargo location 1734, loss description 1735, loss date 1736, currency 1737 and arrival date 1738. Optionally, the currency and arrival date may be data collected in other parts of the import-export system. The claimant 1741 typically will be the importer, but the reporting party 1742 may well be an agent for the importer. In any case, the claimant will be an assured or additional assured under the identified policy.

The present invention may be practiced as a method or device adapted to practice the method. The same method can be viewed from the perspective of the system, the importer, the exporter or the bank. From the system perspective, one aspect of the method provides a computer-aided method of collaborating on tracking of an international shipment of goods and approving payment from a credit facility, the collaboration including an exporter, an importer and an importer's bank. Additional participants optionally may include agents of the exporter, importer or importer's bank, freight forwarders, customs brokers and other participants in the import-export trade process who are identified above. The method may include setting authorizations for international shipment participants to view and edit aspects of data that records conditions and instructions for payment from the importer to the exporter, tracks progress of the international shipment towards meeting the conditions for payment, and allows the importer to electronically initiate payment of the exporter by the importer's bank from the credit facility. The method further may include receiving and storing agreed conditions and instructions for payment, storing and transmitting documentation corresponding to fulfillment of the agreed conditions for payment, without need for bank evaluation of the documentation, and processing in electronically initiated approval to pay, following evaluation by the importer or the importer's agent that the conditions for payment have been fulfilled, modified or waived, the approval to pay corresponding to the agreed conditions and instructions for payment. The method further may include processing and exposing for view a status update confirming payment of the exporter.

In one embodiment, a central server or cluster of servers implements a workflow and dashboard status display as depicted in figures. Based on authorizations of the various international shipment participants, status information is displayed to the participants and they are allowed to electronically review, modify or approve tasks in the workflow. The workflow is integrated across roles and involves assignment of tasks to persons working for multiple independent organizations. For instance, tasks in the processing of an approval to pay may be assigned to persons working for the importer or the importer's agent, working for the exporter or the exporter's agents, and working for the bank. The workflow system may identify the person or persons responsible to take the next action or actions required to move the import-export transaction along. The workflow system also may provide alerts, for actions that are now ready for processing, for status changes and for actions that have been pending for a predetermined time.

A further aspect of the method, from the system perspective, includes transmitting between the importer in the exporter draft conditions and instructions for payment. These drafts may be maintained electronically in a form that permits their use, once they have been agreed upon, for processing as part of the method. Another aspect includes transmitting to the importer's bank the agreed conditions instructions for payment. This information may be transmitted to the importer's bank for information, without requiring any substantial action on the part of bank employees that would significantly increase the cost of the transaction. In one embodiment, the status update confirming payment of the exporter is initiated by the bank, corresponding to the approval to pay. Alternatively, the exporter could be required to acknowledge receipt of payment to the system. This acknowledgment would support non-repudiation.

An aspect of the method includes exposing to view by the international shipment participants status information regarding establishment of the conditions instructions for payment, the documentation of fulfillment and the approval of fulfillment, or the abatement or waiver of the conditions for payment.

An embodiment of the method, implemented as a computer system, includes payment from a credit facility as part of an integrated collaborative system that facilitates an import-export transaction from negotiation of terms, to initiation of shipment by the exporter, through transit and customs clearance, to receipt by the importer and settlement.

The method, viewed from the importer's perspective, is very similar to the method viewed from the system perspective. The importer aspect of the present invention provides a computer-aided method of collaborating on tracking in international shipment goods and approving payment from a credit facility, the collaboration including an exporter, and importer and an importer's bank. Additional participants optionally may include agents of the exporter, importer or importer's bank, freight forwarders, custom brokers and other disciplines in the import-export trade process who are identified above. The method may include setting authorizations for international shipment participants to view and edit aspects of data that records conditions and instructions for payment from the importer to the exporter, tracks progress of the international shipment towards meeting the conditions for payment, and allows the importer to electronically initiate payment of the exporter by the importer's bank from the credit facility. The method further may include receiving agreed instructions for payment and receiving documentation from the exporter or exporter's agent corresponding to fulfillment of the agreed conditions for payment, without need for bank evaluation of the documentation. The method further includes electronically initiating an approval to pay following evaluation by the importer or the importer's agent that the conditions for payment have been fulfilled, modify or waived, the approval to pay corresponding to the instructions for payment and receiving a status update confirming payment of the exporter. Variations, aspects and embodiments of the method viewed from the system perspective and the system implementing a workflow and dashboard status display also apply to the method as viewed from the importer's perspective.

The method viewed from the exporter's perspective is again similar. The exporter aspect of the present invention provides a computer-aided method of collaborating on tracking in international shipment goods and approving payment from a credit facility, the collaboration including an exporter, and importer and an importer's bank. Additional participants identified above may optionally be included in the collaborative system. The method may include setting authorizations for international shipment participants to view and edit aspects of data that records conditions and instructions for payment from the importer to the exporter, tracks progress of the international shipment towards meeting the conditions for payment, and allows the importer to electronically initiate payment of the exporter by the importer's bank from the credit facility. The method further may include receiving agreed instructions for payment and generating document creation corresponding to fulfillment of the conditions for payment, without need for bank evaluation the documentation. The method further may include receiving notification that the importer's bank has been approved to pay the exporter, following evaluation by the importer or the importer's agent that the conditions for payment have been fulfilled, modified or weight, the approval to pay corresponding to the instructions for payment, and receiving a status update confirming payment. Variations, aspects and embodiments of the method viewed from the system perspective and the system implementing a workflow and dashboard status display also apply to the method as viewed from the exporter's perspective.

The method viewed from the bank's perspective is similar, if less involved. The bank aspect of the present invention provides a computer-aided method of collaborating on tracking in international shipment goods and approving payment from a credit facility, the collaboration including an exporter, and importer and an importer's bank. Additional participants identified above may optionally be included in the collaborative system. The method may include electronically receiving an approval to pay to pay the exporter, following evaluation by the importer or the importer's agent that the conditions for payment have been fulfilled, modified or waived, the approval to pay corresponding to agreed instructions for payment, and posting a status update confirming payment to a tracking system, wherein the tracking system authorizes international shipment participants. Variations, aspects and embodiments of the method viewed from the system perspective and the system implementing a workflow and dashboard status display also apply to the method as viewed from the bank's perspective.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to carry out collaborative tracking of an international shipment of goods, media impressed with logic to carry out carry out collaborative tracking of an international shipment of goods, data streams impressed with logic to carry out collaborative tracking of an international shipment of goods, or computer-accessible services that carry out carry out collaborative tracking of an international shipment of goods. It is contemplated that modifications and combinations will readily occur to those skilled in the art, which modifications and combinations will be within the spirit of the invention and the scope of the following claims.

We claim as follows:

1. A computer-aided method of collaborating on the terms and conditions of shipment and sale, the creation of documents and the tracking of an international shipment of goods and approving payment from a credit facility or demand deposit account, the collaboration including an exporter, an importer and an importer's bank, the method including:

setting authorizations for international shipment participants to enter, view and approve aspects of data that record conditions and instructions for payment from the importer to the exporter, track progress of the international shipment participants toward meeting the conditions for payment, and allow the importer to electronically approve payment to the exporter by the importer's bank from the credit facility or demand deposit account;

receiving and recording agreed conditions and instructions for payment;

mapping fields of documents needed to evidence fulfillment to the data recording the conditions and instructions for payment and establishing synchronization rules for propagation of data among and editing of the mapped fields;

applying the synchronization rules to propagate the data to the documents needed to evidence fulfillment using the mapping, wherein the synchronization rules restrict users' ability to override the propagated data fields once a document preparation state for the agreed conditions and instructions reaches a predetermined level;

receiving documentation from the exporter or exporter's agent corresponding to fulfillment of the agreed conditions for payment, without need for bank evaluation of the documentation;

electronically initiating an approval to pay following evaluation by the importer or the importer's agent that the conditions for payment have been fulfilled, modified or waived, the approval to pay corresponding to the instructions for payment; and receiving a status update confirming payment of the exporter.

2. The method of claim 1, wherein setting authorizations further includes authorizations for the international shipment participants to view images of documents.

3. The method of claim 1, further including sending draft conditions and instructions for payment to the exporter.

4. The method of claim 1, further including advising the importer's bank of the agreed conditions and instructions for payment.

5. The method of claim 1, wherein payment is executed by the importer's bank, corresponding to the approval to pay.

6. The method of claim 1, further including exposing to view by the international shipment participants status tracking information regarding establishment of the conditions and instructions for payment, the documentation of fulfillment and the approval of fulfillment, or the abatement or waiver of the conditions for payment.

7. The method of claim 6, wherein the exposed status information identifies, for particular roles, whether the particular roles are responsible to carry out a next step in the establishment of the conditions and instructions for payment;

the documentation of fulfillment; and the approval of fulfillment, or the abatement or waiver of the conditions for payment.

8. The method of claim 1, wherein the conditions and instructions for payment are selected from a plurality of INCO terms and specifying the conditions and instructions for payment includes choosing from a list of INCO terms.

9. A computer-aided method of collaborating on the terms and conditions of shipment and sale, the creation of documents and the tracking of an international shipment of goods and authorizing payment from a credit facility or demand deposit account, the collaboration including an exporter, an importer and an importer's bank, the method including:

setting authorizations for international shipment participants to view and edit aspects of data that records conditions and instructions for payment from the importer to the exporter, tracks progress of the international shipment participants toward meeting the conditions for payment, and allows the importer to electronically approve payment of the exporter by the importer's bank from the credit facility or demand deposit account;

receiving and recording agreed conditions and instructions for payment;

mapping fields of documents needed to evidence fulfillment to the data recording the conditions and instructions for payment and establishing synchronization rules for propagation of data among and editing of the mapped fields;

applying the synchronization rules to propagate the data to the documents needed to evidence fulfillment using the mapping, wherein the synchronization rules restrict users' ability to override the propagated data fields once a document preparation state for the agreed conditions and instructions reaches a predetermined level;

generating or uploading documentation corresponding to fulfillment of the conditions for payment, without need for bank evaluation of the documentation;

receiving notification that the importer's bank has been approved to pay the exporter, following evaluation by the importer or the importer's agent that the conditions for payment have been fulfilled, modified or waived, the approval to pay corresponding to the instructions for payment; and receiving a status update confirming transmittal of payment.

10. The method of claim 9, wherein setting authorizations further includes authorizations for the international shipment participants to view images of documents.

11. The method of claim 9, further including receiving draft conditions and instructions for payment from the importer.

12. The method of claim 9, wherein the status update is generated by the importer's bank, corresponding to the approval to pay.

13. The method of claim 9, further including exposing to view by the international shipment participants status tracking information regarding establishment of the conditions and instructions for payment, the documentation of fulfillment and the approval of fulfillment, or the abatement or waiver of the conditions for payment.

14. The method of claim 13, wherein the exposed status information identifies, for particular roles, whether the particular roles are responsible to carry out a next step in the establishment of the conditions and instructions for payment, the documentation of fulfillment and the approval of fulfillment, or the abatement or waiver of the conditions for payment.

15. The method of claim 9, wherein the conditions and instructions for payment are selected from a plurality of INCO terms and specifying the conditions and instructions for payment includes choosing from a list of INCO terms.

16. A computer-aided method of collaborating on the terms and conditions of shipment and sale, the creation of documents and the tracking of an international shipment of goods and approving payment from a credit facility or demand deposit account, the collaboration including an exporter, and importer and an importer's bank, the method including:

setting authorizations for international shipment participants to view and edit aspects of data that records conditions and instructions for payment from the importer to the exporter, tracks progress of the international shipment participants toward meeting the conditions for payment, and allows the importer to electronically initiate payment of the exporter by the importer's bank from the credit facility or demand deposit account;

receiving and storing agreed conditions and instructions for payment;

mapping fields of documents needed to evidence fulfillment to the data recording the conditions and instructions for payment and establishing synchronization rules for propagation of data among and editing of the mapped fields;

applying the synchronization rules to propagate the data to the documents needed to evidence fulfillment using the mapping, wherein the synchronization rules restrict users' ability to override the propagated data fields once a document preparation state for the agreed conditions and instructions reaches a predetermined level;

storing and transmitting documentation corresponding to fulfillment of the agreed conditions for payment, without need for bank evaluation of the documentation;

processing an electronically initiated approval to pay, following evaluation by the importer or the importer's agent that the conditions for payment have been fulfilled, modified or waived, the approval to pay corresponding to the stored agreed conditions and instructions for payment; and processing and exposing for view a status update confirming payment to the exporter.

17. The method of claim 16, wherein setting authorizations further includes authorizations for the international shipment participants to view images of documents.

18. The method of claim 16, further including transmitting between the importer and the exporter draft conditions and instructions for payment.

19. The method of claim 16, further including transmitting to the importer's bank the agreed conditions and instructions for payment.

20. The method of claim 16, wherein the confirmation is initiated by the importer's bank, corresponding to the approval to pay.

21. The method of claim 16, further including exposing to view by the international shipment participants status tracking information regarding establishment of the conditions and instructions for payment, the documentation of fulfillment and the approval of fulfillment, or the abatement or waiver of the conditions for payment.

22. The method of claim 21, wherein the exposed status information identifies, for particular roles, whether the particular roles are responsible to carry out the next step in the establishment of the conditions and instructions for payment, the documentation of fulfillment and the approval of fulfillment, or the abatement or waiver of the conditions for payment.

23. The method of claim 16, wherein the conditions and instructions for payment are selected from a plurality of INCO terms and specifying the conditions and instructions for payment includes choosing from a list of INCO terms.

24. A computer-aided system that facilitates collaborative tracking of an international shipment of goods and approval of payment from credit facility, the collaborators including an exporter, and importer and importer's bank, the system including a computer system, including storage, resources and logic accessible by international shipment participants, the logic adapted to:

set authorizations for the international shipment participants to view and had aspects of data that record conditions and instructions for payment from the importer to the exporter, track progress of the international shipment participants toward meeting the conditions for payment, and allow the importer to electronically approve payment of the exporter by the importer's bank from the credit facility;

receive and store agreed conditions and instructions for payment;

map fields of documents needed to evidence fulfillment to the data recording the conditions and instructions for payment and establishing synchronization rules for propagation of data among and editing of the mapped fields;

apply the synchronization rules to propagate the data to the documents needed to evidence fulfillment using the mapping, wherein the synchronization rules restrict users' ability to override the propagated data fields once a document preparation state for the agreed conditions and instructions reaches a predetermined level;

store and transmit documentation corresponding to fulfillment of the agreed conditions for payment, without need for bank evaluation of the documentation;

process an electronically initiated approval to pay, following evaluation by the importer or the importer's agent that the conditions for payment have been fulfilled, modified or waived, the approval to pay corresponding to the stored agreed conditions and instructions for payment; and process and expose to view a status update confirming payment of the exporter.

25. The system of claim 24, wherein, in the logic adapted to set authorizations, the conditions and instructions for payment are selected from a plurality of INCO terms and specifying the conditions and instructions for payment includes choosing from a list of INCO terms.

* * * * *

UNITED STATES PATENT AND TRADEMARK OFFICE
CERTIFICATE OF CORRECTION

| | |
|---|---|
| PATENT NO. | : 7,406,440 B2 |
| APPLICATION NO. | : 10/776587 |
| DATED | : July 29, 2008 |
| INVENTOR(S) | : Steve M. Viarengo et al. |

Page 1 of 1

It is certified that error appears in the above-identified patent and that said Letters Patent is hereby corrected as shown below:

In Col. 19 claim 16, line 20-21, "and importer", should read --an importer--

In Col. 20 claim 24, line 24, "and importer and importer's", should read --an importer and an importer's--

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,406,440 B2 | Page 1 of 1 |
| APPLICATION NO. | : 10/776587 | |
| DATED | : July 29, 2008 | |
| INVENTOR(S) | : Steve M. Viarengo et al. | |

It is certified that error appears in the above-identified patent and that said Letters Patent is hereby corrected as shown below:

Column 20:
     In claim 24, line 29, "to view and had aspects of data", should read --to view and edit aspects--

Signed and Sealed this

Twenty-first Day of April, 2009

JOHN DOLL
*Acting Director of the United States Patent and Trademark Office*